(12) United States Patent
Wakamatsu

(10) Patent No.: US 8,509,610 B2
(45) Date of Patent: Aug. 13, 2013

(54) IMAGE STABILIZATION CONTROL APPARATUS, IMAGING APPARATUS, AND IMAGE STABILIZATION CONTROL METHOD

(75) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 71 days.

(21) Appl. No.: 13/271,807

(22) Filed: Oct. 12, 2011

(65) Prior Publication Data

US 2012/0093493 A1 Apr. 19, 2012

(30) Foreign Application Priority Data

Oct. 19, 2010 (JP) ................................. 2010-234208

(51) Int. Cl.
*G03B 17/00* (2006.01)
(52) U.S. Cl.
USPC ............................................................ 396/55
(58) Field of Classification Search
USPC .......................................................... 396/55
See application file for complete search history.

(56) References Cited

U.S. PATENT DOCUMENTS

| | | | |
|---|---|---|---|
| 5,649,237 A | 7/1997 | Okazaki | |
| 6,047,132 A | 4/2000 | Maeda | |
| 2006/0098967 A1 | 5/2006 | Togawa | |
| 2007/0147813 A1* | 6/2007 | Washisu | 396/53 |
| 2008/0298790 A1 | 12/2008 | Uenaka et al. | |
| 2010/0013937 A1 | 1/2010 | Washisu et al. | |
| 2010/0074605 A1* | 3/2010 | Washisu | 396/53 |
| 2010/0215353 A1* | 8/2010 | Hashi et al. | 396/55 |

FOREIGN PATENT DOCUMENTS

| | | |
|---|---|---|
| CN | 101630107 | 1/2010 |
| JP | 07-225405 | 8/1995 |
| JP | 3513950 | 3/2004 |
| JP | 2010-025962 | 2/2010 |

OTHER PUBLICATIONS

Dec. 19, 2011 European Search Report of the counterpart European Patent Application No. 11185058.2.

* cited by examiner

*Primary Examiner* — Rodney Fuller
(74) *Attorney, Agent, or Firm* — Cowan, Liebowitz & Latman, P.C.

(57) ABSTRACT

An image stabilization control apparatus corrects image shake, which is caused by the shake of a camera, using a shake correction unit. An angular velocity sensor detects angular rotational shake in the yaw direction, and an angular velocity sensor detects angular rotational shake in the roll direction. An accelerometer detects acceleration in the horizontal direction. A camera CPU calculates a first correction amount for use in the correction of translational shake in the yaw direction using the outputs of the angular velocity sensor and the accelerometer, and calculates a second correction amount for use in the correction of translational shake in the roll direction using the outputs of the angular velocity sensor and the accelerometer. A driving unit drives a shake correction unit in accordance with the correction amount of translational shake.

17 Claims, 15 Drawing Sheets

IMAGE STABILIZATION CONTROL APPARATUS, IMAGING APPARATUS, AND IMAGE STABILIZATION CONTROL METHOD

BACKGROUND OF THE INVENTION

1. Field of the Invention

The present invention relates to image stabilization control technology that corrects or prevents image shake or image degradation occurring due to shakes such as hand shake.

2. Description of the Related Art

In recent years, all operations of a camera significant to image capture, such as the operation for determining the exposure and a focusing operation, may be performed automatically. Accordingly, even a user who is not accustomed to using a camera may nearly always succeed in taking high quality pictures. In addition, recently marketed cameras include an image stabilization control apparatus consisting of a shake correction unit, a driving unit, a shake detection unit, and the like and are configured to prevent image shake occurring due to shakes such as hand shake. A camera including an image stabilization control apparatus consisting of a shake correction unit, a driving unit, a shake detection unit, and the like almost eliminates the factors for inducing a shooting mistake by a photographer.

Here, an image stabilization control apparatus will be briefly described. The hand shake that may occur with a camera during image capture is a shake with a frequency of generally 1 to 10 Hz. To take a photograph without any image shake even when such hand shake is applied to a camera when the shutter release button is pressed, it is necessary to detect the angular rotational shake applied to the camera due to hand shake and displace a lens for correcting image shake (hereinafter simply referred to as a "compensation lens") according to the detected value.

Meanwhile, when an image is taken at a close distance (under a capture condition in which a high imaging magnification is used), image degradation which caused by translational shake may not be ignored. For example, when an object image is taken at such a close object distance of about 20 cm in the case of macro photography, it becomes necessary to actively detect and correct the translational shake. Under capture conditions in which the focal length of an imaging optical system is very large (e.g., 400 mm) even when a sufficient object distance of 1 meter is ensured, it also becomes necessary to detect and correct the translational shake. However, translational shake may not be detected only by an angular velocity sensor and is applied to the horizontal direction or the vertical direction lying in a plane perpendicular to the optical axis of the camera.

Japanese Patent Laid-Open No. 7-225405 discloses a technology in which an accelerometer configured to detect acceleration is provided to detect translational shake by taking the second integral of the detected acceleration and drive a shake correction unit according to the detected translational shake value and an output from an angular velocity meter, which is provided separately.

Japanese Patent Laid-Open No. 2010-25962 discloses a technology in which translational shake is equivalent to angular rotational shake when the rotation center is located far from the camera.

The conventional method for performing translational shake correction using the rotation radius of angular rotational shake may cause the following circumstances.

For detecting translational shake in the horizontal direction of a camera, a yaw angular velocity sensor that is mounted for correcting yaw angular rotational shake and an acceleration sensor that detects acceleration in the horizontal direction of a camera are employed. A translational shake correction amount in the horizontal direction is calculated from the detected values obtained by both sensors. However, for translational shake in the horizontal direction of a camera, it is difficult to accurately determine a translational shake correction amount because the camera may be affected by translational shake associated with rotation of the camera in the roll direction in addition to translational shake associated with rotation of the camera in the yaw direction. In particular, when there is little rotation of the camera in the pitch direction and translational shake in the vertical direction associated with rotation of the camera in the roll direction is large, it is difficult to accurately determine a correction amount for translational shake in the vertical direction only by detecting the angular velocity in the pitch direction and the acceleration in the vertical direction. Note that the same applies to the detection of translational shake in the pitch direction.

SUMMARY OF THE INVENTION

The present invention provides an image stabilization control apparatus that performs image shake correction with high accuracy with respect to translational shake occurring due to the influence of angular rotational shakes applied to the optical apparatus while taking shake in a direction around the optical axis into consideration, and a method for controlling the same.

In order to overcome the aforementioned circumstances, according to an aspect of the present invention, an image stabilization control apparatus is provided that comprises of a shake correction unit configured to be movable in a direction different from an imaging optical axis direction; a first shake detection unit configured to detect angular rotational shake in a first direction perpendicular to the optical axis; a second shake detection unit configured to detect angular rotational shake in a second direction around the optical axis, the second direction is not the same as the first direction; a third shake detection unit configured to detect a translational shake of the device; a control unit configured to calculate a correction amount for use in the correction of translational shake in the first and second directions using the outputs of the first, second, and third shake detection units; and a driving unit configured to drive the shake correction unit in accordance with the correction amount.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

First Embodiment

Figure 1:
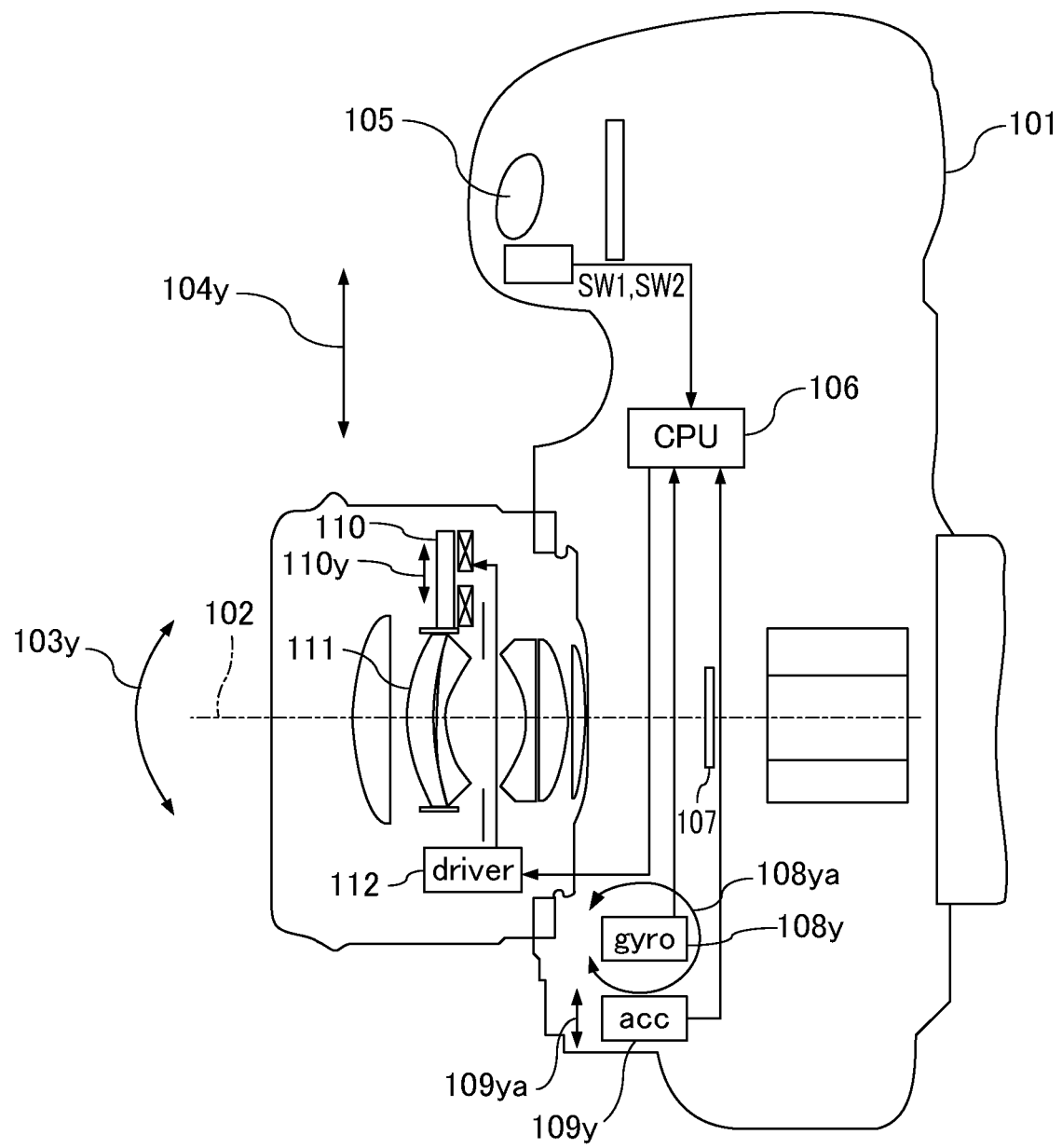
FIG. 1 is a schematic view of a camera having an image stabilization function as viewed from above in order to explain a first embodiment of the present invention in conjunction with FIGS. 2 to 10.
Figure 2:
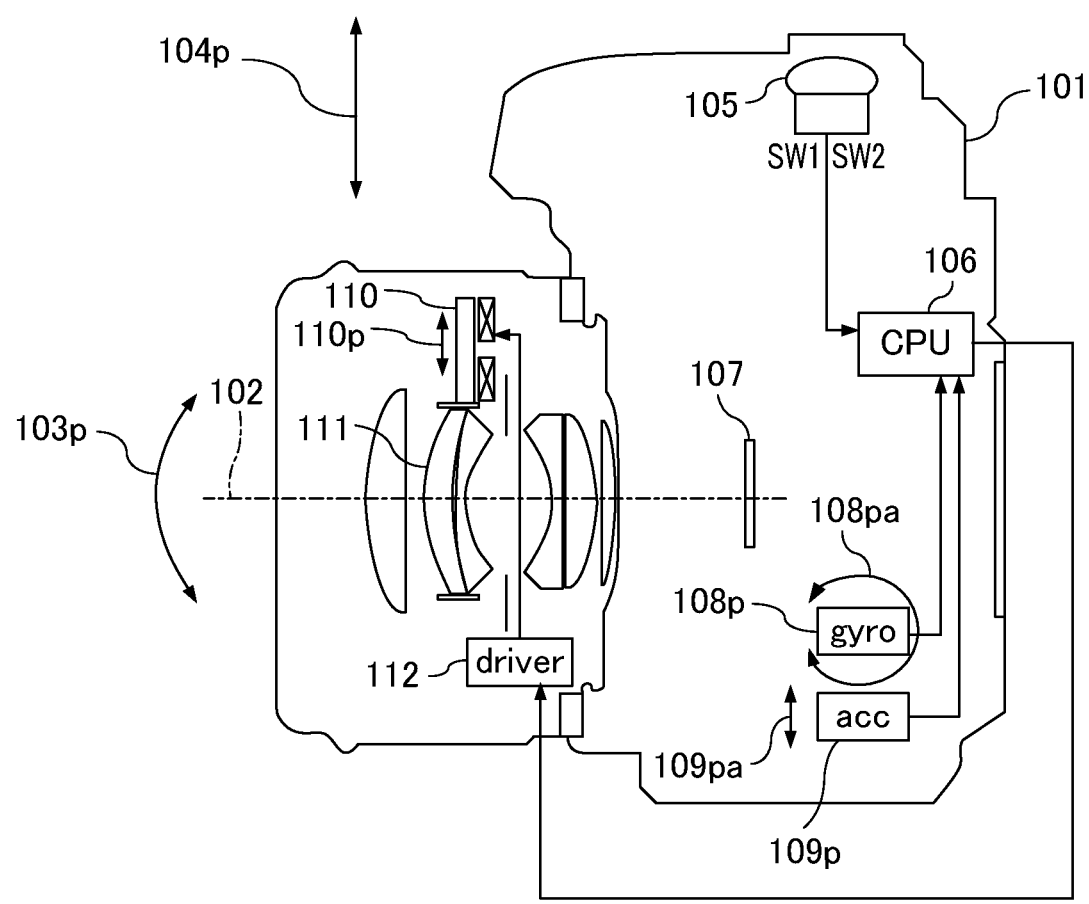
FIG. 2 is a schematic view of a camera as viewed from the side thereof.
Figure 3:
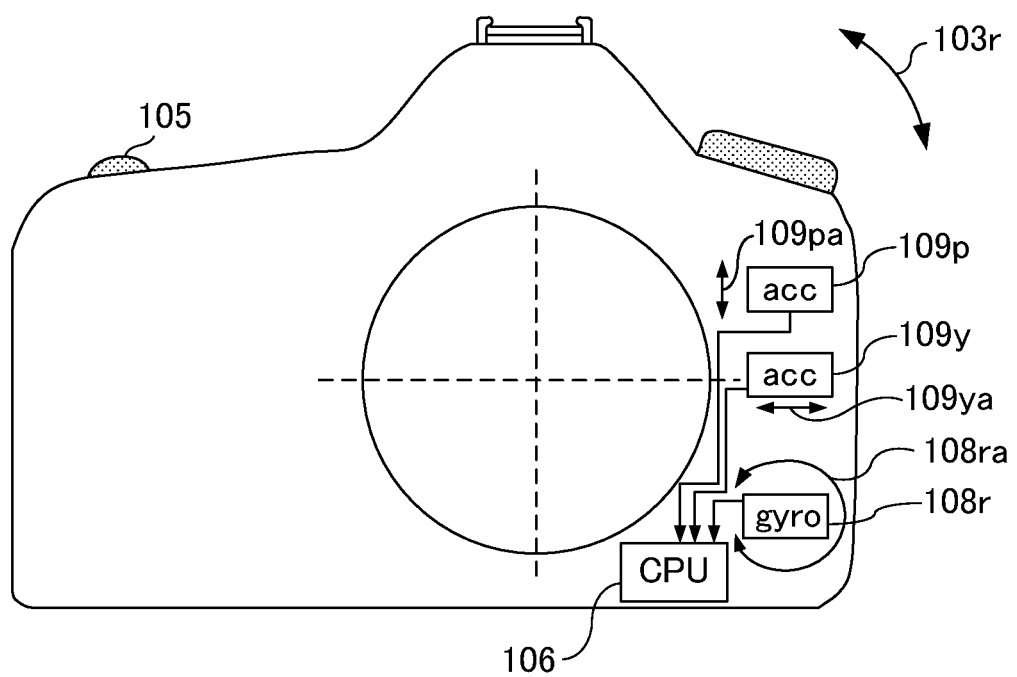
FIG. 3 is a schematic view of a camera as viewed from the front thereof.

Each of FIGS. 1 to 3 shows an exemplary configuration of a camera serving as an optical apparatus that includes an image stabilization control apparatus according to a first embodiment of the present invention. FIG. 1 is a schematic view of a camera as viewed from above. FIG. 2 is a schematic view of a camera as viewed from the side thereof. FIG. 3 is a schematic view of a camera as viewed from the front thereof. The axis shown by a dot-dash line in FIGS. 1 to 3 represents an optical axis 102 of an imaging optical system of a camera 101. In an image stabilization system mounted on the camera 101, the correction of image shake is performed based on the shake (hereinafter referred to as "angular rotational shake") shown by the arrows 103$p$, 103$y$, and 103$r$ and the shake (hereinafter referred to as "translational shake") shown in the arrows 104$p$ and 104$y$ with respect to the optical axis 102. Reference symbol "p" is appended to a reference number indicating the pitch direction and reference symbol "y" is appended to a reference number indicating the yaw direction. The pitch direction and the yaw direction are mutually orthogonal to each other, and both directions are orthogonal to the optical axis. For the directions of angular rotational shake to be applied to the camera 101, a first direction is set to the yaw direction (see the arrow 103$y$) or the pitch direction (see the arrow 103$p$), and a second direction is set to the roll direction (see the arrow 103$r$). The directions of translational shake to be applied to the camera 101 are a horizontal direction (see the arrow 104$y$) and a vertical direction (see the arrow 104$p$) that are orthogonal to the optical axis of the imaging optical system of the camera 101.

A release button 105 is mounted on the camera body 101, and a switch opening/closing signal input by operation of the button is transmitted to a camera CPU (Central Processing Unit) 106. In the present embodiment, a two-step switch is provided in which a first switch (hereinafter referred to as "SW1") is switched to the ON state when the release button 105 is half-pressed and a second switch (hereinafter referred to as "SW2") is switched to the ON state when the release button 105 is fully pressed. The camera CPU 106 controls a camera's operation, and is responsible for controlling image shake correction. In other words, the camera CPU 106 functions as a control unit that controls image shake correction. The imaging element 107 converts an object image, which has been obtained through the lens of an imaging optical system, into an electrical signal to be output to a signal processing unit (not shown).

A shake detection unit that detects a shake of a camera is constituted by angular velocity detection units and acceleration detection units.

The angular velocity sensors 108$p$, 108$y$, and 108$r$ are angular velocity detection units configured to detect angular rotational shake around the arrows 108$pa$, 108$ya$, and 108$ra$, respectively. Also, the accelerometers 109$p$ and 109$y$ are acceleration detection units configured to detect translational shake shown by the arrows 109$pa$ and 109$ya$, respectively. The signals detected by the angular velocity sensors 108$p$, 108$y$, and 108$r$ and the accelerometers 109$p$ and 109$y$ are input to the camera CPU 106.

The shake correction unit 110 drives a compensation lens 111 in a direction different from the imaging optical axis direction (especially, in a direction perpendicular to the optical axis), more specifically, in a direction shown by the arrow 110$y$ in FIG. 1 and in a direction shown by the arrow 110$p$ in FIG. 2, and performs shake correction taking into account both angular rotational shake and translational shake. A driving unit 112 drives the shake correction unit 110 in accordance with a control command given by the camera CPU 106. With this arrangement, a shake correction operation is performed.

In the present embodiment, an optical image stabilization system is employed for moving the compensation lens 111 in a plane normal to the optical axis based on the correction amount calculated by the camera CPU 106. A correction method based on the correction amount is not limited to optical image stabilization, but another method may also be employed. For example, an image stabilization method for preventing a shake by moving the imaging element 107 in a plane normal to the optical axis, or an electronic image stabilization method for reducing the influence of shake by changing the cut-out position of each imaging frame output by an imaging element may be employed. A correction method for combining these methods as appropriate may also be employed.

Next, a description will be given of angular rotational shake and translational shake of the camera 101.

Figure 4:
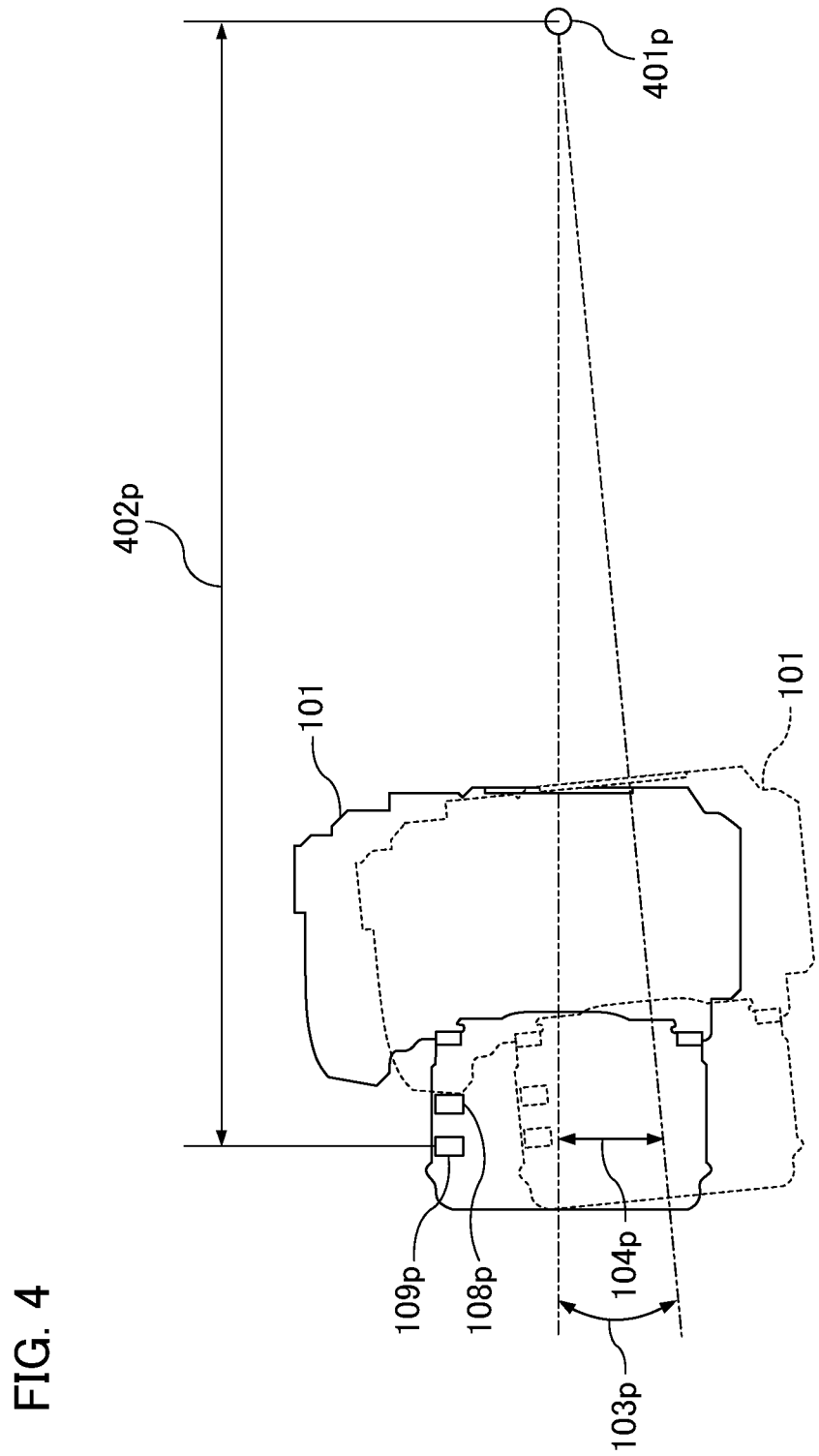
FIG. 4 is an illustrative diagram of a shake of a camera in the pitch direction and the rotation center thereof.

FIG. 4 shows angular rotational shake 103$p$ generated during pitching of the camera 101 and translational shake 104$p$ generated in the vertical direction of the camera 101. In a principle point location of the imaging lens, i.e., the imaging optical system of the camera 101, the magnitude of the translational shake 104$p$ is represented by "Y", and the magnitude of the angular rotational shake 103$p$, i.e., angular displacement, is represented by "θ". When the rotation center 401$p$ of angular rotational shake is defined, the length of the rotation radius 402$p$ is represented by "L". The length "L" corresponds to the distance between the rotation center 401$p$ and the accelerometer 109$p$. Also, the angular velocity is represented by "ω", the velocity is represented by "V", the acceleration is represented by "A", and the angle acceleration is represented by "ωa". At this time, the following relationship is satisfied.

$$Y = L \times \theta \quad \text{Formula (1)}$$

$$V = L \times \omega \quad \text{Formula (2)}$$

$$A = L \times \omega a \quad \text{Formula (3)}$$

Here, a displacement "Y" in Formula (1) is calculated by second-order integration of the output of the accelerometer 109p, an angular displacement "θ" is calculated by first-order integration of the output of the angular velocity sensor 108p. Thus, when "Y" is divided by "θ", the length "L" of the rotation radius is calculated. Also, a velocity "V" in Formula (2) is calculated by first-order integration of the output of the accelerometer 109p, and an angular velocity "ω" is calculated by the output of the angular velocity sensor 108p. Thus, when "V" is divided by "ω", the length "L" of the rotation radius is calculated. Acceleration "A" in Formula (3) is calculated by the output of the accelerometer 109p, and an angle acceleration "ωa" is calculated by first-order differentiation of the output of the angular velocity sensor 108p. Thus, when "A" is divided by "ωa", the length "L" of the rotation radius is calculated. Any of Formula (1) to (3) can be used to calculate the value L.

Using the translational shake "Y" at the principle point location of the imaging optical system, and the shake angle "θ" and the focal length "f" of the imaging optical system, and the imaging magnification "β", the shake amount "δ", which may occur on the imaging surface, can be calculated by the following Formula (4).

$$\delta = (1+\beta) \times f \times \theta + \beta \times Y \quad \text{Formula (4)}$$

The values of "f" and "β" of the first term of the right side of Formula (4) can be calculated based on positional information regarding the zoom and focus of the imaging optical system, and the imaging magnification and the focal length obtained thereby. The shake angle "θ" can be calculated by first-order integration of the output of the angular velocity sensor 108p. Accordingly, the angular rotational shake can be corrected by using such information as described above.

For the second term of the right side of Formula (4), the symbol "β" can be calculated based on positional information regarding the zoom and focus of the imaging optical system, and the imaging magnification obtained thereby, and the value of "Y" can be calculated by second-order integration of the output of the accelerometer 109p. Accordingly, the translational shake can be corrected by using such information as described above.

However, in the present embodiment, correction of image shake is executed with respect to the shake amount "δ", which can be acquired by the following Formula (5), which is a modification of Formula (4):

$$\delta = (1+\beta) \times f \times \theta + \beta \times L \times \theta \quad \text{Formula (5)}$$

In other words, with respect to the translational shake "Y", the present embodiment does not use the displacement of translational shake, which can be calculated directly based on a result of integration by the accelerometer 109p. The length "L" of the rotation radius is calculated using Formula (1), Formula (2), or Formula (3), and the shake amount "δ" is calculated based on the value L, the integration result (θ) of the output of the angular velocity sensor 108p, and the imaging magnification "β".

A description will be given of translational shake of a camera with reference to FIGS. 5 to 7.

Assume that only pitching of a camera occurs. When the translational shake 104p generated in the vertical direction of the camera is only affected by the angular rotational shake 103p in the pitch direction, translational shake can be appropriately corrected using the aforementioned method. However, when translational shake caused by the shake in the pitch direction does not occur but translational shake caused by the shake in the roll direction occurs as shown in FIG. 5, the value of angular rotational shake in the pitch direction becomes very small. At this time, when the length "L" of the rotation radius is calculated using the aforementioned method, the detected value of angular rotational shake in the pitch direction becomes very small, whereas the detected value of acceleration becomes very large. Consequently, the value L becomes very large. In conducting the control of shake using the computed value L, there is no correlation between the detected value of acceleration and angular rotational shake in the pitch direction, and thus, translational shake cannot be suitably calculated. When image stabilization control is carried out using the correction amount based on the magnitude of erroneously-estimated translational shake, the possibility of a degradation in the control performance of image stabilization increases.

Figure 5:
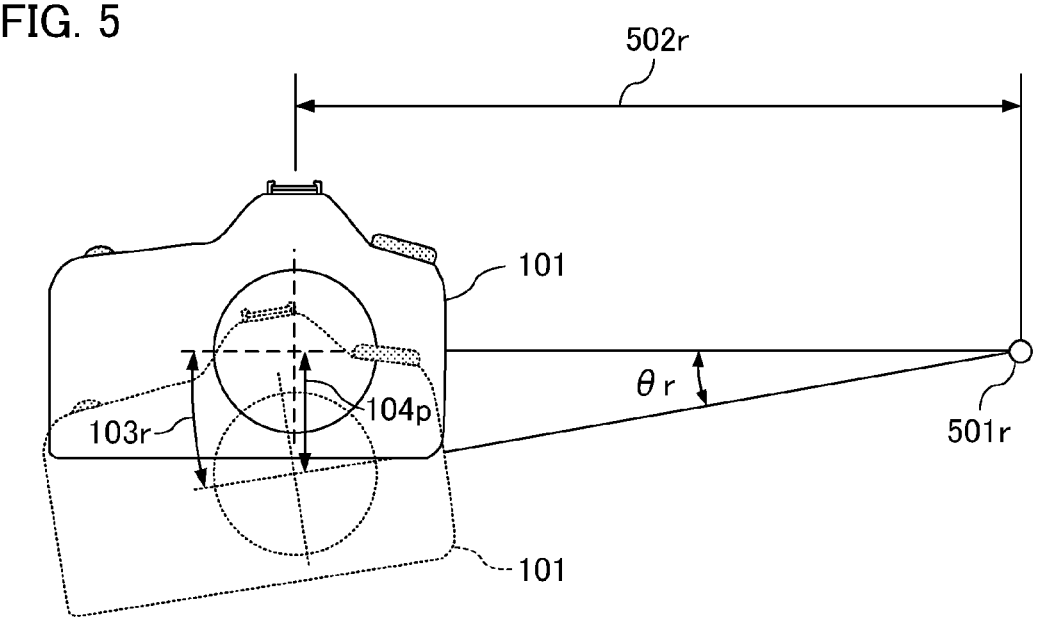
FIG. 5 is an illustrative diagram of a shake of a camera in the roll direction and the rotation center thereof related to the movement of the camera in the vertical direction.

Accordingly, when translational shake caused by the shake in the pitch direction does not occur but translational shake in the vertical direction caused by the shake in the roll direction occurs as shown in FIG. 5, the shake amount "δ" is calculated by the following method.

When the translational shake 104p at a principle point location of the imaging optical system of the camera 101, the angular rotational shake 103r in the roll direction, and the rotation center 501r thereof are defined, the length of the rotation radius 502r is represented by "L". When the magnitude of the angular rotational shake 103r in the roll direction is represented by "θr", translational shake in the vertical direction is corrected using "θr", and the length "L" of the rotation radius 502r, an appropriate correction effect can be obtained. In other words, the shake amount "δ" is calculated using Formula (6) instead of Formula (5).

$$\delta = (1+\beta) \times f \times \theta + \beta \times L \times \theta r \quad \text{Formula (6)}$$

Translational shake in the horizontal direction of a camera may be corrected in a similar manner as described above.

Figure 6:
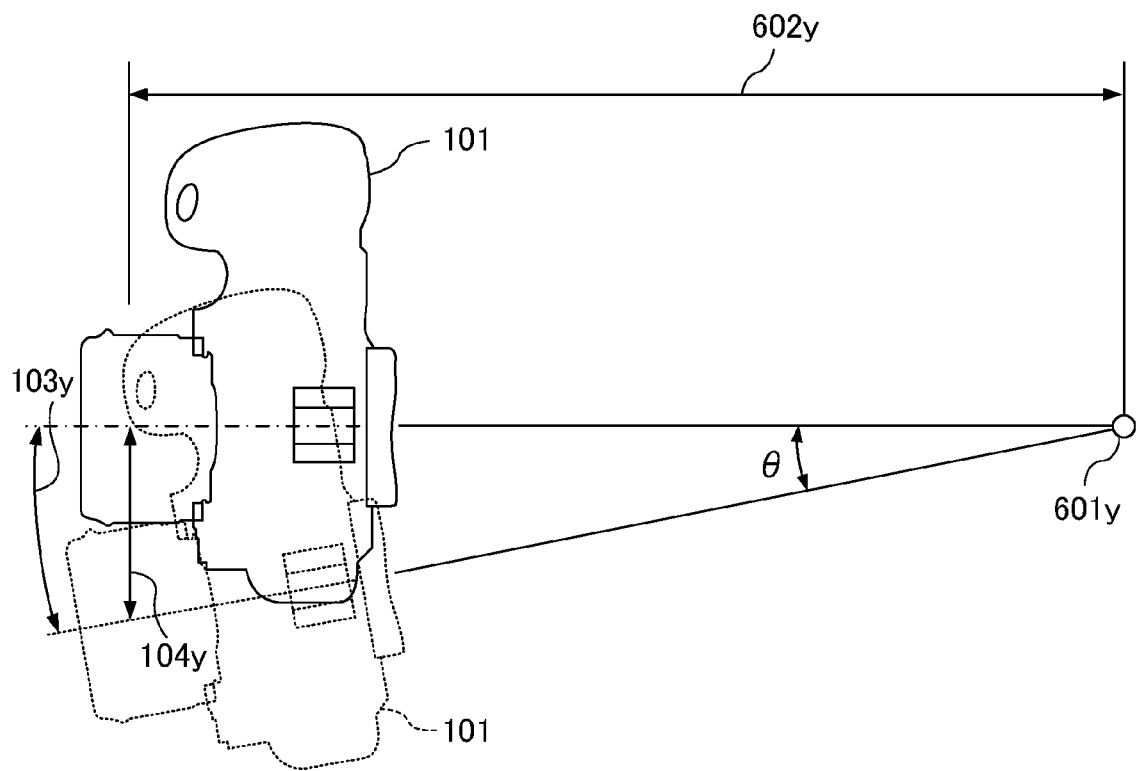
FIG. 6 is an illustrative diagram of a shake of a camera in the yaw direction and the rotation center thereof.

FIG. 6 shows angular rotational shake 103y generated during yawing of the camera 101 and translational shake 104y generated in the horizontal direction of the camera 101. When the translational shake 104y at a principle point location of the imaging optical system of the camera 101, the angular rotational shake 103y in the yaw direction, and the rotation center 601y thereof are defined, the length of the rotation radius 602y is represented by "L" (see Formulae (1) to (5)). For translational shake in the horizontal direction, when translational shake caused by the shake in the yaw direction does not occur but translational shake in the horizontal direction caused by the shake in the roll direction occurs as shown in FIG. 7, the shake amount "δ" may be calculated as in Formula (6). In other words, when the translational shake 104y at a principle point location of the imaging optical system of the camera 101, the angular rotational shake 103r in the roll direction, and the rotation center 701r thereof are defined, the length of the rotation radius 702r is represented by "L". When translational shake in the horizontal direction is corrected using the magnitude "θr" of the angular rotational shake 103r in the roll direction and the length "L" of the rotation radius 702r, an appropriate correction effect can be obtained.

Figure 8:
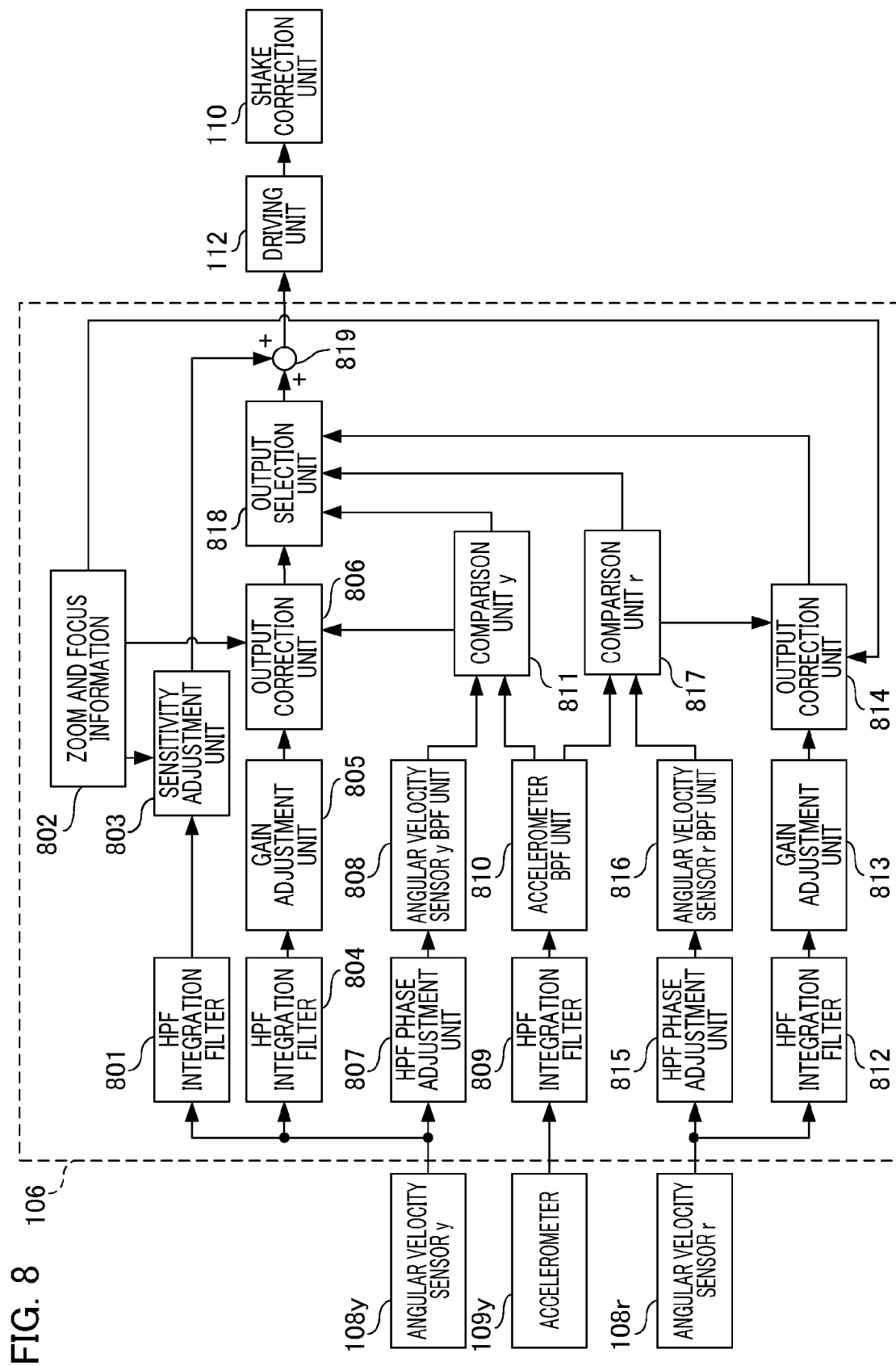
FIG. 8 is a block diagram illustrating an exemplary configuration of an image stabilization control apparatus.

FIG. 8 is a block diagram illustrating an exemplary configuration of an image stabilization control apparatus according to the present embodiment. FIG. 8 only shows the configuration regarding to the shake (directions shown by the arrows 103y and 104y in FIG. 1 and FIG. 2) generated in the horizontal direction of the camera 101. However, the same configuration is also provided for the shake (directions shown by the arrows 103p and 104p in FIG. 1 and FIG. 2) generated in the vertical direction of the camera. Since they basically have the same configuration, only the configuration in the yaw direction and the roll direction will be described below. FIG. 3 shows a functional block of processing performed by the camera CPU 106. The camera CPU 106 interprets and executes a program stored in a memory (not shown) to thereby perform each processing.

A description will be given of the correction of angular rotational shake with reference to FIG. 8. In FIG. 8, two angular velocity sensors are provided. An angular velocity sensor 108y is an angular velocity sensor y (first shake detection unit), and an angular velocity sensor 108r is an angular velocity sensor r (second shake detection unit). Angular rotational shake is detected by the angular velocity sensor y and the angular velocity sensor r to thereby perform shake correction under the control of the camera CPU 106. In this example, a description will be given of the angular velocity sensor 108y employed as a first shake detection unit. The angular velocity sensor 108y and the angular velocity sensor 108p are interchangeable with each other, and both sensors perform control in the same manner except that the direction of the shake detection is different.

An angular velocity signal from the angular velocity sensor 108y is input to an HPF integration filter 801 of the camera CPU 106. A signal, of which the DC (direct current) component has been cut out by an HPF (high pass filter), is integrated by the HPF integration filter 801 to thereby be converted into an angle signal. The frequency band of hand shake falls within the range of about 1 to 10 Hz. The HPF of the HPF integration filter 801 has primary HPF characteristics that shut off a frequency component (e.g., 0.1 Hz or lower) sufficiently far from the frequency band of hand shake.

The output of the HPF integration filter 801 is input to a sensitivity adjustment unit 803. The sensitivity adjustment unit 803 amplifies the output of the HPF integration filter 801 based on zoom and focus information (positional information) 802 and an imaging magnification determined by the information so as to obtain an angular rotational shake correction target value. The amplified output from the HPF integration filter 801 is used as an angular rotational shake correction target value as described above in order to correct a varied shake correction sensitivity on an image plane of the camera with respect to a shake correction stroke of the shake correction unit 110, which has varied due to variation in optical information such as a focusing lens position or a zooming lens position. The sensitivity adjustment unit 803 sends the determined angular rotational shake correction target value to an adder 819. The adder 819 adds the output of an output selection unit 818 to be described below to the output of the sensitivity adjustment unit 803, and outputs the resulting output as an image shake correction amount to the driving unit 112. The driving unit 112 drives the shake correction unit 110 to thereby perform image shake correction.

Next, a description will be given of translational shake correction. Translational shake generated in an apparatus in a horizontal direction or a vertical direction in the plane perpendicular to the optical axis of the imaging optical system is detected by an accelerometer 109y (third shake detection unit), and thus, shake correction is performed under the control of the camera CPU 106.

The output of the angular velocity sensor 108y is input to an HPF integration filter 804. Then, the HPF of the HPF integration filter 804 filters out DC components from the output. Furthermore, the output is integrated to be converted into an angle signal. The output of the HPF integration filter 804 is input to a gain adjustment unit 805. The gain adjustment unit 805 and the HPF integration filter 804 adjust the gain and phase characteristics in a frequency band to be subject to translational shake correction. The output of the gain adjustment unit 805 is corrected by an output correction unit 806 to be described below, and thus, a correction target value of translational shake in the yaw direction is computed. The output of the output correction unit 806 is sent to the adder 819 via the output selection unit 818.

Also, the output of the angular velocity sensor 108y, in parallel with the above-described processing, is input to an HPF phase adjustment unit 807. The HPF phase adjustment unit 807 filters out DC components that overlap the output of the angular velocity sensor 108y, and adjusts the phase of the signal. Here, the cutoff frequency is adjusted to match the cutoff frequency of the HPF of an HPF integration filter 809 to be described below, such that the frequency characteristics are matched to each other. The output of the HPF phase adjustment unit 807 is sent to an angular velocity sensor y BPF (band pass filter) unit 808 serving as a band pass unit to thereby extract a frequency component in a predetermined band.

The output of the accelerometer 109y is input to the HPF integration filter 809. Then, the HPF of the HPF integration filter 809 filters out DC components from the output. Then, the output is integrated to be converted into a velocity signal. As described above, the cutoff frequency of the HPF of the HPF integration filter 809 is set so as to be matched with the frequency characteristics of the HPF of the HPF phase adjustment unit 807. The output of the HPF integration filter 809 is sent to an accelerometer BPF unit 810 serving as a band pass unit to thereby extract a frequency component in a predetermined band.

The outputs of the angular velocity sensor y BPF unit 808 and the accelerometer BPF unit 810 are input to a comparison unit y 811 (first comparison unit). The comparison unit y 811 calculates a correction value (first correction coefficient) for correcting the output of the gain adjustment unit 805, and outputs the calculated correction value to an output correction unit 806. The output correction unit 806 computes an imaging magnification using zoom and focus information 802, and corrects the output of the gain adjustment unit 805 based on the determined imaging magnification and the aforementioned correction coefficient. With this arrangement, a correction target value of translational shake in the yaw direction is calculated using the detection results by the angular velocity sensor 108y and the accelerometer 109y.

Next, a description will be given of the calculation of a correction target value of translational shake in the roll direction.

The output of the angular velocity sensor 108r is input to an HPF integration filter 812. Then, the HPF of the HPF integration filter 812 filters out DC components from the output. Furthermore, the output is integrated to be converted into an angle signal. The output of the HPF integration filter 812 is input to a gain adjustment unit 813. The gain adjustment unit 813 and the HPF integration filter 812 adjust the gain and phase characteristics in a frequency band to be subject to translational shake correction. The output of the gain adjustment unit 813 is corrected by an output correction unit 814 to be described below, and thus, a correction target value of translational shake in the roll direction is computed.

Also, the output of the angular velocity sensor 108r, in parallel with the above-described processing, is input to an HPF phase adjustment unit 815. The HPF phase adjustment unit 815 filters out DC components that overlap the output of the angular velocity sensor 108r, and adjusts the phase of the signal. Here, the cutoff frequency is adjusted to match the cutoff frequency of the HPF of the HPF integration filter 809 such that the frequency characteristics are matched to each other. The output of an HPF phase adjustment unit 815 is sent to an angular velocity sensor r BPF unit 816 to thereby extract a frequency component in a predetermined band.

The outputs of the angular velocity sensor r BPF unit 816 and the accelerometer BPF unit 810 are input to a comparison unit r 817 (second comparison unit). The comparison unit r 817 calculates a correction value (second correction coefficient) for correcting the output of the gain adjustment unit 813, and outputs the calculated correction value to an output correction unit 814. The output correction unit 814 computes an imaging magnification using the zoom and focus information 802, and corrects the output of the gain adjustment unit 813 based on the determined imaging magnification and the correction coefficient from the comparison unit r 817. In this manner, a correction target value of translational shake in the roll direction is calculated using the detection results by the angular velocity sensor 108r and the accelerometer 109y.

The outputs of the output correction units 806 and 814 are input to the output selection unit 818. The output selection unit 818 outputs the selected translational shake correction target amount to the adder 819 depending on the outputs of the comparison unit y 811 and the comparison unit r 817. The adder 819 adds the translational shake correction target value to the aforementioned angular rotational shake correction target value, and outputs the results to the driving unit 112. In this manner, the shake correction unit 110 is driven by the driving unit 112, and thus, image shake is corrected for both angular rotational shake and translational shake.

Next, a description will be given of a correction value to be output from the comparison unit y 811 and the comparison unit r 817. The comparison unit y 811 receives the outputs of the angular velocity sensor y BPF unit 808 and the accelerometer BPF unit 810, and calculates the length "L" of the rotation radius using the angular velocity "ω" and the velocity "V" as shown in the following Formula (ω). The comparison unit y 811 sends the determined value L to the output correction unit 806. The value L corresponds to a first correction coefficient. [Formula 5]

$$L = V/\omega \quad (7)$$

Likewise, the comparison unit r 817 receives the outputs of the angular velocity sensor r BPF unit 816 and the accelerometer BPF unit 810, and calculates the length "L" of the rotation radius using Formula (7). The comparison unit r 817 sends the determined value L to the output correction unit 814. The value L corresponds to a second correction coefficient.

The rotation radius "L" may be calculated by the ratios of the respective maximum amplitude peak values of the velocity "V" and the angular velocity "ω" within a predetermined time (e.g., the time set to 200 ms when the cutoff frequency for both of the angular velocity sensor y BPF unit 808 and the accelerometer BPF unit 810 is 5 Hz). Furthermore, the rotation radius "L" may be updated for each moment at which the velocity "V" and the angular velocity "ω" have been calculated. At this time, each of the velocity "V" and the angular velocity "ω" are time-sequentially averaged, and a high-frequency component is filtered out by a low pass filter (LPF). Thus, when the rotation radius is calculated, the rotation radius having the high-frequency noise component thereof removed may be calculated. In this case, each of first and second correction coefficients is not an instantaneous value, but corresponds to the average of the rotation radius "L" or a frequency component in a predetermined band.

Figure 9:
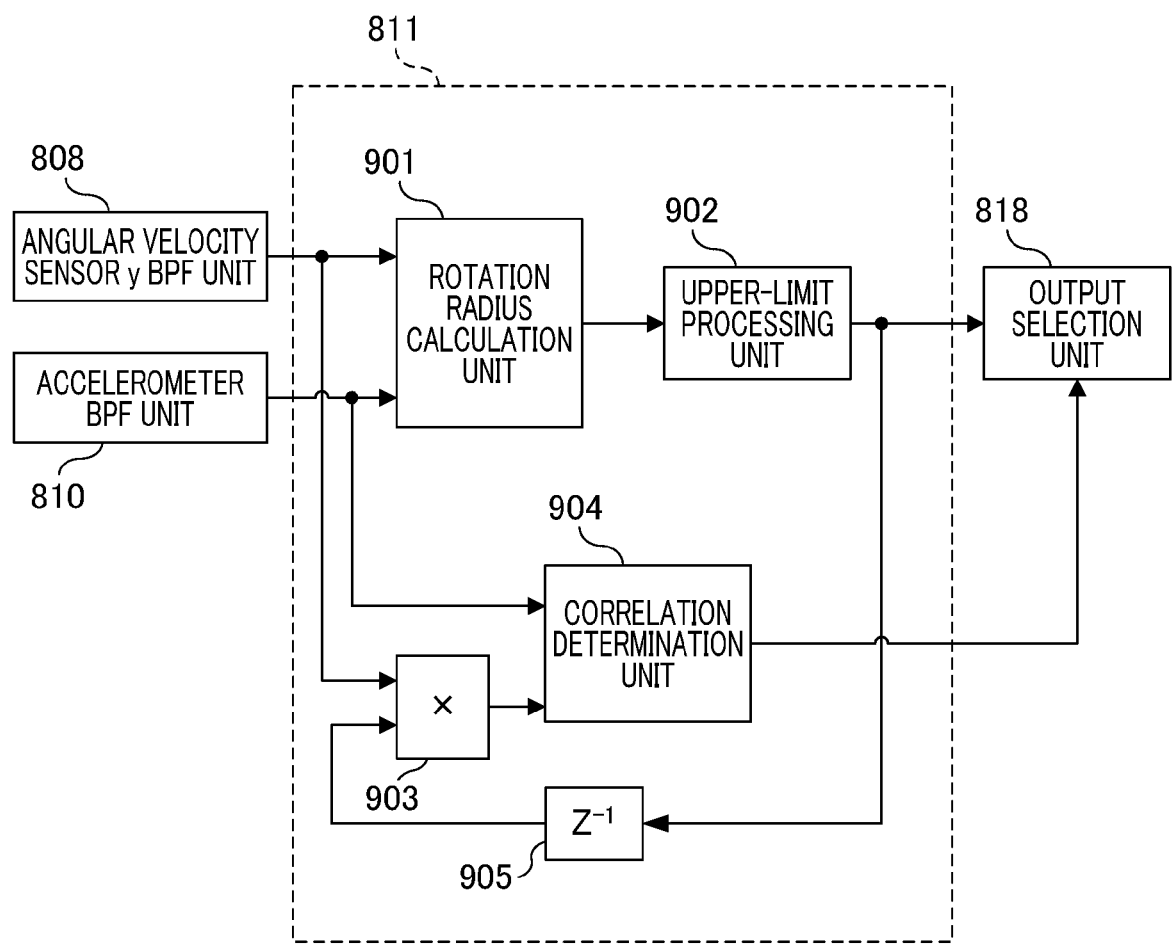
FIG. 9 is a block diagram illustrating the comparison unit shown in FIG. 8.

FIG. 9 is a block diagram illustrating internal processing performed by the comparison unit y 811. Hereinafter, a description will be given of the comparison unit y 811, but the same processing is also performed by the comparison unit r 817.

The outputs of the angular velocity sensor y BPF unit 808 and the accelerometer BPF unit 810 are input to a rotation radius calculation unit 901. The rotation radius calculation unit 901 calculates the length "L" of the rotation radius using Formula (7), and outputs it to an upper-limit processing unit 902. Here, a signal clamped to an upper-limit value is sent to the output selection unit 818.

Here, a description will be given for the reason why the upper-limit processing unit 902 is provided. The rotation radius calculation unit 901 calculates a rotation radius using the output of the angular velocity sensor y BPF unit 808 and the output of the accelerometer BPF unit 810. When a plurality of rotation centers is present and the accelerometer 109y detects composite shake from these rotation centers, the value L may be significantly erroneously estimated depending on the timing of the computation. This is because the rotation radius calculation unit 901 calculates the length of the rotation radius in a frequency band set by the angular velocity sensor y BPF unit 808 and the accelerometer BPF unit 810. When the computation is significantly affected in a frequency band other than the frequency band set by the angular velocity sensor y BPF unit 808 and the accelerometer BPF unit 810, the rotation radius calculation unit 901 may not correctly calculate the rotation radius in the set frequency band.

Here, when the value of the rotation radius is set to a greater degree, translational shake in a frequency band set by the angular velocity sensor y BPF unit 808 and the accelerometer BPF unit 810 can be securely suppressed. However, the gain for the hand shake in a frequency band higher than the frequency band is also increased at the same time, which may undesirably lead to the excessive control of image stabilization performance in the high frequency band of hand shake. In case of shooting a still image, a photographer often carefully takes a picture while tightly holding a camera so as not to cause hand shake. In this situation, a rotation radius value is not a large value. Taking the above into consideration, in order to prevent the image stabilization control performance from being deteriorated due to excessive control, an upper-limit value compatible with the frequency band set by the angular velocity sensor y BPF unit 808 and the accelerometer BPF unit 810 is set in the upper-limit processing unit 902.

The output of the angular velocity sensor y BPF unit 808 is also sent to a multiplier 903. A delay unit 905 delays the output of the upper-limit processing unit 902 by one sampling period and sends the resulting output to the multiplier 903. The delay unit 905 is an output acquisition unit that acquires the output of the upper-limit processing unit 902 at a start of a period of time corresponding to the sampling period before the current point in time.

The output of the multiplier 903 is sent to a correlation determination unit 904, which performs correlation determination between the output of the multiplier 903 and the output of the accelerometer BPF unit 810. The determination results are transmitted to the output selection unit 818.

Figure 10:
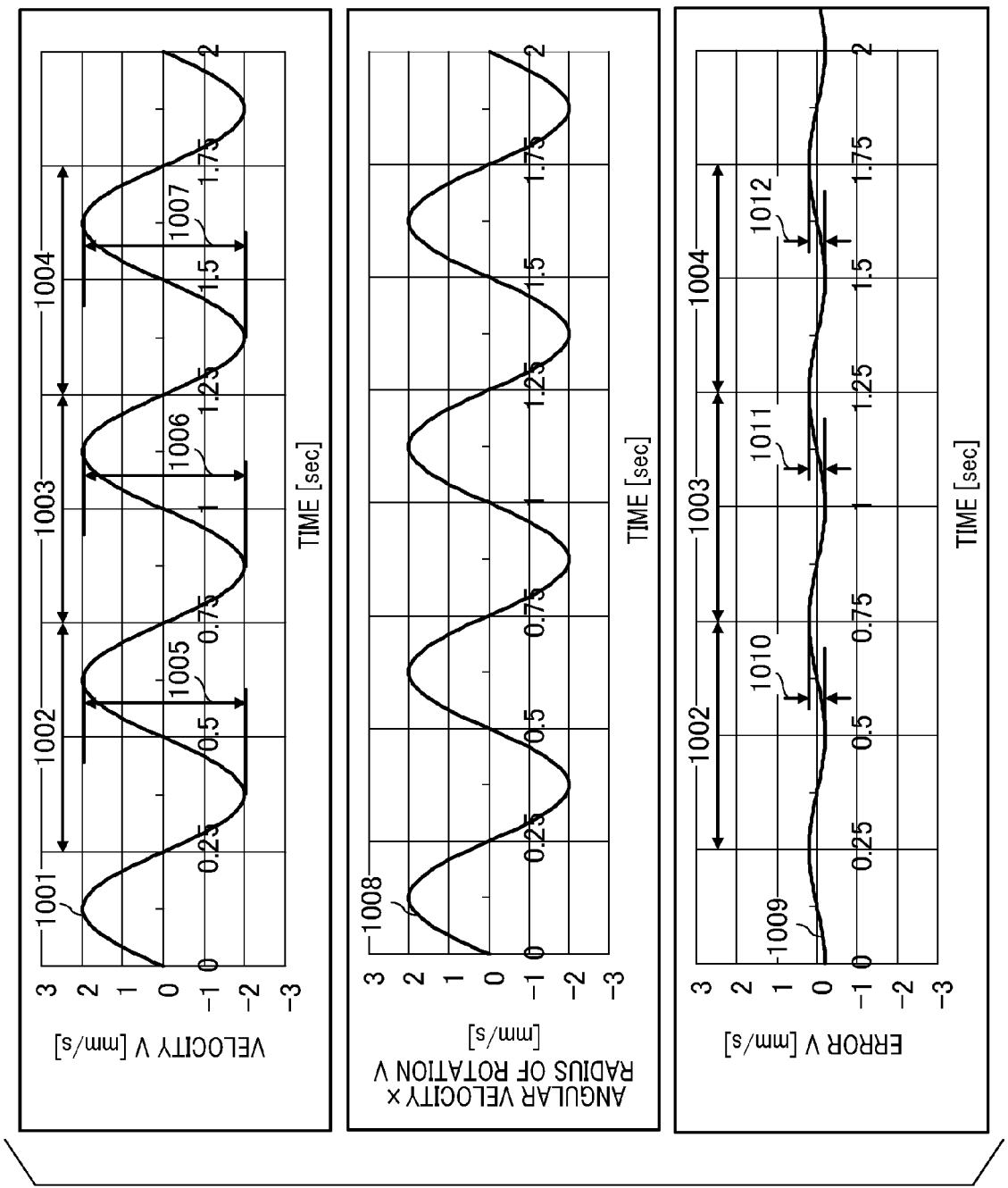
FIG. 10 shows exemplary waveforms for explaining the correlation determination unit shown in FIG. 9.

FIG. 10 shows exemplary graphs of the velocity of the first-order integration of the detected value of acceleration, the product of the angular velocity and the rotation radius, and the time variation of the errors therebetween. A waveform 1001 indicates the change in the output of the accelerometer BPF unit 810. Each of the periods indicated by the reference numbers 1002 to 1004 represents a period corresponding to the sampling period, and each of the reference numbers 1005 to 1007 represents amplitude for each period. A waveform 1008 indicates the change in the output signal of the multiplier 903. In other words, the waveform 1008 is the waveform of a signal in which the output of the angular velocity sensor y BPF unit 808 is multiplied by the rotation radius (the value L acquired before the one sampling period) obtained from the upper-limit processing unit 902. Specifically, in the waveform 1008, the angular velocity calculated by the angular velocity sensor 108$y$ is multiplied by the length "L" of the rotation radius, and thus, the dimensions between the waveform 1008 and the waveform 1001 are matched to each other. Since the length "L" of the rotation radius is calculated by Formula (7), the waveform 1008 is the inversed value thereof, and its amplitude is equal to the amplitude 1005 to 1007 of the waveform 1001. Note that a deviation may occur in a phase relationship between the waveform 1001 and the waveform 1008. The lowermost waveform 1009 indicates the change in the error between the waveform 1001 and the waveform 1008. The reference numbers 1010 to 1012 indicate the amplitudes in periods 1002 to 1004, respectively.

Figure 7:
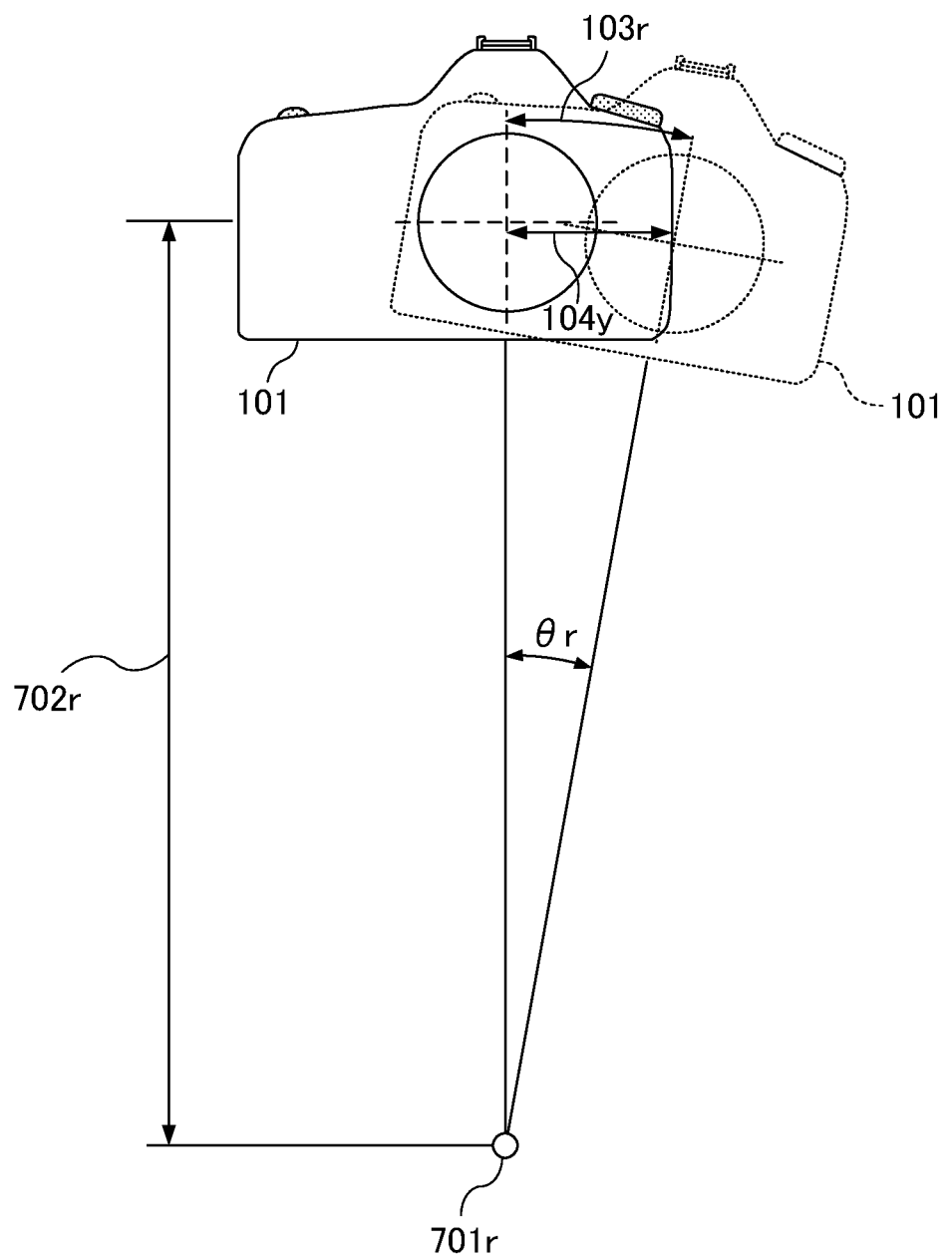
FIG. 7 is an illustrative diagram of a shake of a camera in the roll direction and the rotation center thereof related to the movement of the camera in the horizontal direction.

When the shake detected by the accelerometer 109$y$ is largely affected only by the rotation of the camera in the yaw direction as shown in FIG. 6 but is not significantly affected by the rotation of the camera in the roll direction as shown in FIG. 7, the waveform 1001 and the waveform 1008 are identical. However, when the shake detected by the accelerometer 109$y$ is significantly affected only by the rotation of the camera in the roll direction as shown in FIG. 7 but is not significantly affected by the rotation of the camera in the yaw direction as shown in FIG. 6, angular velocity detection and acceleration detection in the yaw direction are insufficient. Specifically, the rotation radius cannot be computed correctly using the detected values that have been detected by the angular velocity sensor 108$y$ and the accelerometer 109$y$.

Also, when a plurality of rotation centers is present and the shake detected by the accelerometer 109$y$ is the composite of the shake caused by the rotation of the camera in the yaw direction and the shake caused by the rotation of the camera in the roll direction, angular velocity detection and acceleration detection only in the yaw direction are insufficient. When a shake is largely affected by the rotation of the camera in the roll direction, the rotation radius cannot be computed correctly using the detected values that have been detected by the angular velocity sensor 108$y$ and the accelerometer 109$y$. Consequently, the value L may undesirably be estimated as a very large value.

Accordingly, the correlation determination unit 904 of the comparison unit y 811 determines in which direction, among the yaw direction or the roll direction, the shake detected by the accelerometer 109$y$ influences the rotation of the camera. This determination is carried out by checking the correlations between the waveforms 1001 and 1008 shown in FIG. 10. In other words, the correlation determination unit 904 determines which correlation is higher than the other as follows.

Correlation between the output of the accelerometer BPF unit 810 and the output in which the angular velocity obtained by the angular velocity sensor y BPF unit 808 is multiplied by the length "L" of the rotation radius in the yaw direction.

Correlation between the output of the accelerometer BPF unit 810 and the output in which the angular velocity obtained by the angular velocity sensor r BPF unit 816 is multiplied by the length "L" of the rotation radius in the roll direction.

The rotation radius having a higher degree of correlation is selected to perform translational shake correction, and thus, the accuracy of translational shake correction can be enhanced.

A method for calculating the degree of correlation with the shake caused by the rotation of the camera in the yaw direction and the degree of correlation with the shake caused by the rotation of the camera in the roll direction will be described below. Here, a method for calculating the degree of correlation with the shake caused by the rotation of the camera in the yaw direction will be described. Likewise, the degree of correlation with the shake caused by the rotation of the camera in the roll direction is computed by the comparison unit r 817.

In order to determine the degree of match between the waveform 1001 and the waveform 1008 shown in FIG. 10, the correlation determination unit 904 calculates the waveform 1009, which is the difference between the waveform 1001 and the waveform 1008. Then, sampling is performed with respect to the waveform 1001 and the waveform 1009 at a constant frequency, and the results are compared. During each of the sampling periods indicated by arrows 1002 to 1004, the amplitudes (difference between the maximum value and the minimum value) of the waveform 1001 are indicated by arrows 1005 to 1007, and the amplitudes of the waveform 1009 are indicated by arrows 1010 to 1012. The period of the extraction frequency is set as the sampling period. For example, when the extraction frequency is 2 Hz, the sampling period is 0.5 sec. The amplitudes of the waveforms 1001 and 1009 during the sampling period are averaged. The reason for doing this is to avoid deterioration in the accuracy of determination due to a sudden change in the amplitude.

In synchrony with the start of detection for a rotation radius, the correlation determination unit 904 starts calculating the amplitudes of the waveforms 1001 and 1009, and performs average computation thereof until immediately prior to shooting. Furthermore, the correlation determination unit 904 calculates the ratio of these averages to thereby calculate a matching degree determination value between the waveforms 1001 and 1008. The matching degree determination value represents how well the waveform 1001 is matched to the waveform 1008, and is a value which is a measure for determination. The smaller matching degree determination value represents the fact that the waveform 1001 is well matched to the waveform 1008. In other words, the correlation determination unit 904 in the camera CPU 106 determines that the degree of correlation between the waveforms 1001 and 1008 is high. For determining the average of the amplitudes of the waveforms 1001 and 1009, the present invention is not limited to a method for calculating an average from the time point where the rotation radius is detected to the time point where shooting is started, but may be a method for calculating and updating a moving average for a predetermined period. In this case, the matching degree determination value can be calculated using an updated value immediately prior to shooting.

By using the aforementioned method, the matching degree determination value (first determination value) for the shake caused by the rotation of the camera in the yaw direction is calculated, and likewise, the matching degree determination value (second determination value) for the shake caused by the rotation of the camera in the roll direction is also calculated. The output selection unit 818 selects a translational shake correction amount having a smaller matching degree determination value in accordance with an instruction given by the correlation determination unit 904. With this arrangement, translational shake correction is performed during a shooting operation using the correction amount of the translational shake selected immediately prior to shooting. In other words, when the matching degree determination value for the shake caused by the rotation of the camera in the yaw direction is smaller, the output value of the output correction unit 806 is selected as a translational shake correction amount (first correction amount). Also, when the matching degree determination value for the shake caused by the rotation of the camera in the roll direction is smaller, the output value of the output correction unit 814 is selected as a translational shake correction amount (second correction amount). Since translational shake correction may be performed based on the state of shake, the accuracy of translational shake correction is enhanced.

As described above, when translational shake in the horizontal direction is largely affected only by the rotation of the camera in the yaw direction but is little affected by the rotation of the camera in the roll direction, optimum translational shake correction may be performed using the yaw angular velocity sensor 108y and the accelerometer 109y. Also, when translational shake in the horizontal direction is largely affected only by the rotation of the camera in the roll direction but is little affected by the rotation of the camera in the yaw direction, optimum translational shake correction may be performed using the roll angular velocity sensor 108r and the accelerometer 109y. Likewise, when translational shake in the vertical direction is largely affected only by the rotation of the camera in the pitch direction but is little affected by the rotation of the camera in the roll direction, optimum translational shake correction may be performed using the pitch angular velocity sensor 108p and the accelerometer 109p. Furthermore, when translational shake in the vertical direction is largely affected only by the rotation of the camera in the roll direction but is little affected by the rotation of the camera in the pitch direction, optimum translational shake correction may be performed using the roll angular velocity sensor 108r and the accelerometer 109p.

Therefore, in the first embodiment, a small-sized image stabilization control apparatus exhibiting high mobility may provide image stabilization in a stable manner even in the case of macro photography, that is, perform image shake correction in translational shake with high accuracy.

Second Embodiment

Next, a second embodiment of the present invention will be described. The basic configuration of the camera of the second embodiment is similar to that of the camera of the first embodiment. Hence, in the following, a description of the main differences between the two will be given. Components corresponding to or similar to those in the first embodiment are designated by the same reference numerals, and therefore, their explanation will be omitted. Note that the same applies to other embodiments to be described below.

Figure 11:
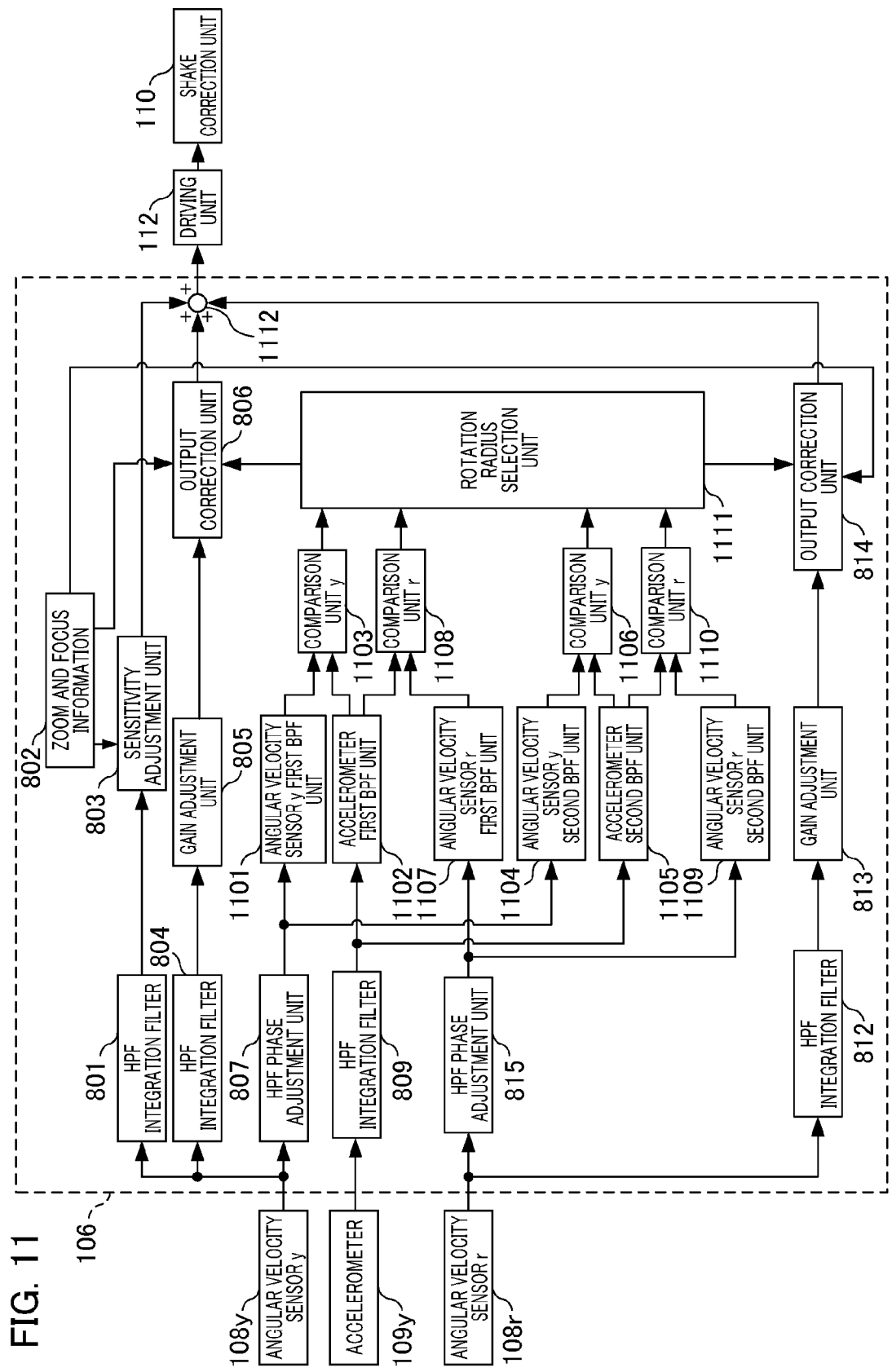
FIG. 11 is a block diagram illustrating an exemplary configuration of an image stabilization control apparatus according to a second embodiment of the present invention.

FIG. 11 is a block diagram illustrating an exemplary configuration of an image stabilization control apparatus provided in the camera of the second embodiment. FIG. 11 only shows the constituent of the shake (directions shown by the arrows 103y and 104y in FIG. 1 and FIG. 2) generated in the horizontal direction of the camera 101. The same configuration is also provided for the shake (directions shown by the arrows 103p and 104p in FIG. 1 and FIG. 2) generated in the vertical direction of the camera. Since, except for the difference in direction, they basically have the same configuration, only the configuration in the horizontal direction of the camera will be described below.

The second embodiment is different from the first embodiment in the following points.

In the first embodiment, the length "L" of the rotation radius is calculated at the specific frequency in each of the rotation in the yaw direction and the rotation in the roll direction as shown in FIG. 8 or the like. In contrast, in the second embodiment, the rotation radius "L" is calculated at a plurality of frequencies in each of the rotation in the yaw direction and the rotation in the roll direction, and the respective translational shake correction amounts thereof are calculated using the optimum length "L" of the rotation radius.

In the second embodiment, the translational shake correction amount that has been calculated for each of the rotation in the yaw direction and the rotation in the roll direction is multiplied by a weighted gain so as to calculate the final translational shake correction amount. The weighted gain is calculated by comparing the degree of correlation between the rotation in the yaw direction and the rotation in the roll direction for each frequency.

The differences between the block diagrams shown in FIG. 8 and FIG. 11 are as follows. The arrow "→" means "substitution".

Angular velocity sensor y BPF unit 808→Angular velocity sensor y first BPF unit 1101

Accelerometer BPF unit 810→Accelerometer first BPF unit 1102

Comparison unit y 811→Comparison unit y 1103

Comparison unit r 817→Comparison unit r 1108

Angular velocity sensor r BPF unit 816→Angular velocity sensor r first BPF unit 1107

Adder 819→Adder 1112

The output selection unit 818 is eliminated, and the outputs of the output correction units 806 and 814 are input to a three-input adder 1112. The added components are as follows. The reference numbers in parentheses indicate the reference numbers of the input source and the output destination, respectively.

Angular velocity sensor y second BPF unit 1104 (input: 807/output: 1106)

Accelerometer second BPF unit 1105 (input: 809/output: 1106, 1110)

Angular velocity sensor r second BPF unit 1109 (input: 815/output: 1110)

Comparison unit y 1106 (input: 1104, 1105/output: 1111)

Comparison unit r 1110 (input: 1105, 1109/output: 1111)

Rotation radius selection unit 1111 (input: 1103, 1106, 1108, 1110/output: 806, 814)

A rotation radius computation method using each comparison unit is similar to that described in the first embodiment. It should be noted that the extraction frequency for band pass filtering is set to be the same level at the angular velocity sensor y first BPF unit 1101, the accelerometer first BPF unit 1102, and the angular velocity sensor r first BPF unit 1107. Also, the extraction frequency for band pass filtering is set so as to be the same level at the angular velocity sensor y second BPF unit 1104, the accelerometer second BPF unit 1105, and the angular velocity sensor r second BPF unit 1109. In the first BPF unit and the second BPF unit, the frequencies within the range of from 1 to 10 Hz (e.g., 2 Hz and 10 Hz, respectively), which are the frequency bands of hand shake, are set. While, in the present embodiment, two types of frequency bands are set, the rotation radius may be calculated by setting three or more types of frequency bands.

From the rotation radius regarding the rotation in the yaw direction and the rotation in the roll direction, a rotation radius selection unit 1111 calculates the rotation radius for final usage. The method will be described below.

Figure 12:
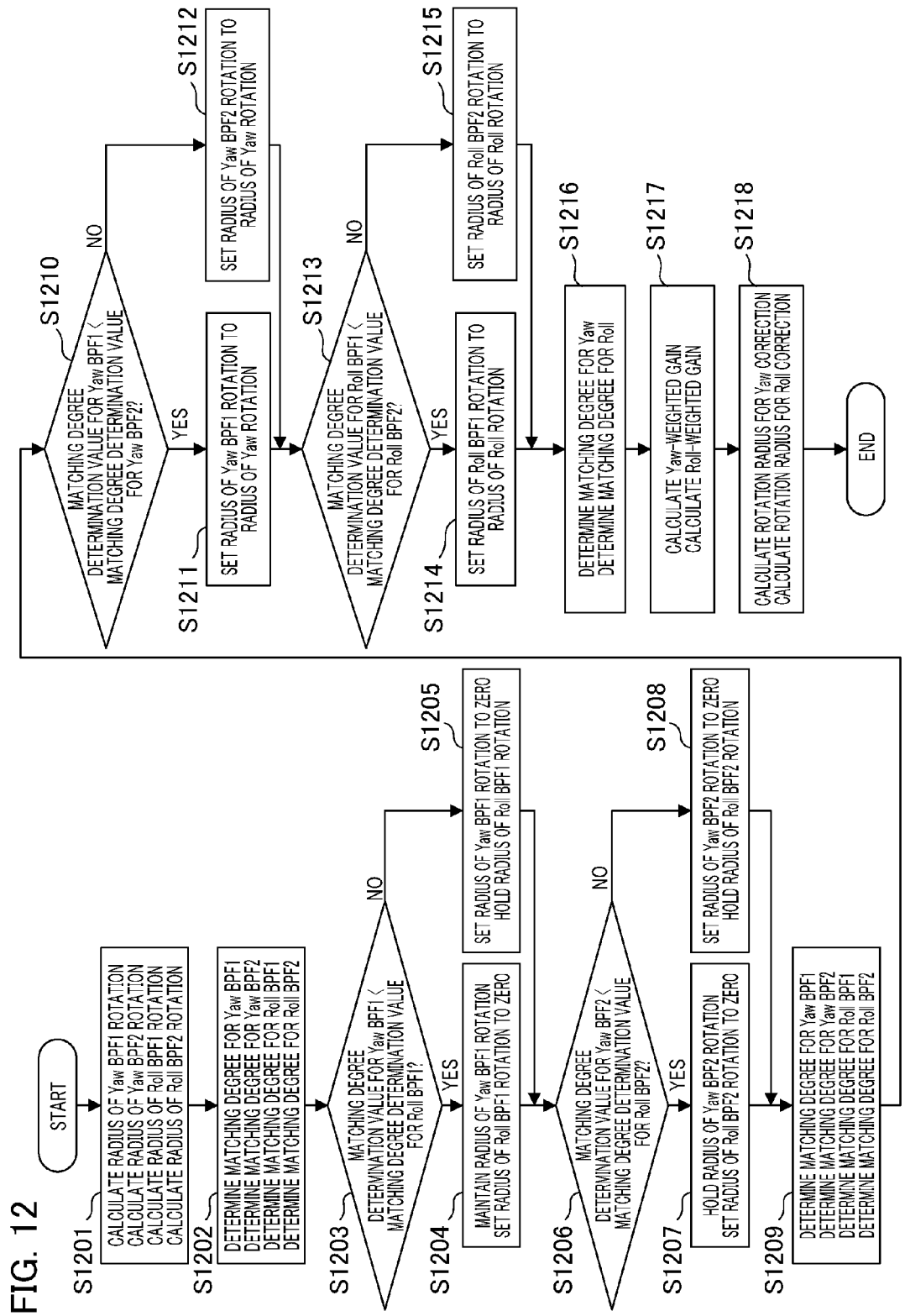
FIG. 12 is a flowchart illustrating an example of processing performed by the image stabilization control apparatus shown in FIG. 11.

FIG. 12 is a flowchart illustrating an example of rotation radius selection processing. In FIG. 12, the symbol "Yaw" represents the yaw direction, and the symbol "Roll" represents the roll direction. The symbol "BPF1" represents a first BPF unit, and the symbol "BPF2" represents a second BPF unit.

In step S1201, each of the comparison units calculates the length of the rotation radius. The comparison unit y 1103 calculates a "radius of Yaw BPF1 rotation", and the comparison unit y 1106 calculates a "radius of Yaw BPF2 rotation". The comparison unit r 1108 calculates a "radius of Roll BPF1 rotation", and the comparison unit r 1110 calculates a "radius of Roll BPF2 rotation". The name of the rotation radius is distinguished by having the name of the direction and the BPF unit to be involved.

Next, in step S1202, the matching degree determination values are calculated. Specifically, the correlation determination units of the comparison units calculate the matching degree determination values for Yaw BPF1, Yaw BPF2, Roll BPF1, and Roll BPF2. A calculation method is as has been described with reference to the correlation determination unit 904 shown in the block diagram in FIG. 9 and FIG. 10. The comparison unit y 1103 calculates a matching degree determination value for the Yaw BPF1, and the comparison unit y 1106 calculates a matching degree determination value for the Yaw BPF2. The comparison unit r 1108 calculates a matching degree determination value for the Roll BPF1, and the comparison unit r 1110 calculates a matching degree determination value for the Roll BPF2.

Next, in step S1203, the rotation radius selection unit 1111 compares the matching degree determination value for the Yaw BPF1 with the matching degree determination value for the Roll BPF1. When the matching degree determination value for the Yaw BPF1 is smaller than the matching degree determination value for the Roll BPF1, the process advances to step S1204. When the matching degree determination value for the Yaw BPF1 is equal to or greater than the matching degree determination value for the Roll BPF1, the process advances to step S1205. In step S1204, the value calculated in step S1201 is maintained as the radius of Yaw BPF1 rotation, and the radius of Roll BPF1 rotation is set to zero. In step S1205, the radius of Yaw BPF1 rotation is set to zero, and the value calculated in step S1201 is held as the radius of Roll BPF1 rotation.

Next, in step S1206, the rotation radius selection unit 1111 compares the matching degree determination value for the Yaw BPF2 with the matching degree determination value for the Roll BPF2. When the matching degree determination value for the Yaw BPF2 is smaller than the matching degree determination value for the Roll BPF2, the process advances to step S1207. When the matching degree determination value for the Yaw BPF2 is equal to or greater than the matching degree determination value for the Roll BPF2, the process advances to step S1208. In step S1207, the value calculated in step S1201 is held as the radius of Yaw BPF2 rotation, and the radius of Roll BPF2 rotation is set to zero. In step S1208, the radius of Yaw BPF2 rotation is set to zero, and the value calculated in step S1201 is held as the radius of Roll BPF2 rotation.

Next, in step S1209, the matching degree determination values are calculated in a similar manner to the process in step S1202 based on the reset rotation radius. In step S1210, the rotation radius selection unit 1111 compares the matching degree determination value for the Yaw BPF1 with the matching degree determination value for the Yaw BPF2. When the matching degree determination value for the Yaw BPF1 is smaller than the matching degree determination value for the Yaw BPF2, the process advances to step S1211. When the matching degree determination value for the Yaw BPF1 is equal to or greater than the matching degree determination value for the Yaw BPF2, the process advances to step S1212.

In step S1211, the radius of Yaw BPF1 rotation is set as the radius of Yaw rotation (value L in the yaw direction). In step S1212, the radius of Yaw BPF2 rotation is set as the radius of Yaw rotation.

Next, in step S1213, the rotation radius selection unit 1111 compares the matching degree determination value for the Roll BPF1 with the matching degree determination value for the Roll BPF2. When the matching degree determination value for the Roll BPF1 is smaller than the matching degree determination value for the Roll BPF2, the process advances to step S1214. When the matching degree determination value for the Roll BPF1 is equal to or greater than the matching degree determination value for the Roll BPF2, the process advances to step S1215. In step S1214, the radius of Roll BPF1 rotation is set as the radius of Roll rotation (value L in the roll direction). In step S1215, the radius of Roll BPF2 rotation is set as the radius of Roll rotation.

Next, in step S1216, the rotation radius selection unit 1111 performs Yaw matching degree determination and Roll matching degree determination from the rotation radius set in the aforementioned steps. Here, when the radius of Yaw rotation is set to zero based on the values of the rotation radii calculated in steps S1201 to 1215, it is determined that the camera may be little affected by translational shake associated with rotation of the camera in the yaw direction. In this case, in step S1217, the value of the Yaw-weighted gain is set to zero, and the value of the Roll-weighted gain is set to one. Also, when the radius of Roll rotation is set to zero, it is determined that the camera may be little affected by translational shake caused by the rotation in the roll direction. In this case, in step S1217, the value of the Yaw-weighted gain is set to one, and the value of the Roll-weighted gain is set to zero.

When both of the radius of Yaw rotation and the radius of Roll rotation have a value other than zero, it is determined that the camera may be affected by translational shake associated with rotation of the camera in the yaw direction and the roll direction. In other words, the axis of the rotation radius to be affected may differ depending on the frequency band (e.g., a shake with a frequency of 2 Hz is largely affected by the rotation of the camera in the yaw direction, and a shake with a frequency of 10 Hz is largely affected by the rotation of the camera in the roll direction). In this case, the matching degree determination values in the yaw direction and the roll direction are set in accordance with the fact that the radius of Yaw rotation and the radius of Roll rotation are set to the respective radius of rotation in a frequency band of either a BPF1 (first BPF unit) or a BPF2 (second BPF unit). When the radius of rotation in the BPF1 is set as the radius of Yaw rotation (when the radius of Yaw BPF2 rotation is set to zero), the matching degree determination value for Yaw BPF1 is set as the matching degree determination value for Yaw. When the radius of Roll BPF2 rotation is set as the radius of Roll rotation (when the radius of Roll BPF1 rotation is set to zero), the matching degree determination value for Roll BPF2 is set as the matching degree determination value for Roll.

During gain calculation processing in step S1217, the rotation radius selection unit 1111 calculates a Yaw-weighted gain (referred to as "Yaw Gain") and a Roll-weighted gain (referred to as "Roll Gain"). When the matching degree determination value for Yaw is referred to as "Yaw Jdg" and the matching degree determination value for Roll is referred to as "Roll Jdg", both of which have been calculated in step S1216, a Yaw-weighted gain "Yaw Gain" and a Roll-weighted gain "Roll Gain" are calculated using Formulae (8) and (9).

Yaw Gain=Roll *Jdg*/(Yaw *Jdg*+Roll *Jdg*)　　　Formula (8)

Roll Gain=1−Yaw Gain　　　Formula (9)

When the value of Roll Jdg (or Yaw Jdg) is small, the degree of correlation in the roll direction (or the yaw direction) increases. Hence, it should be noted that the Yaw Gain (or Roll Gain) becomes small.

In the next step S1218, the rotation radius selection unit 1111 multiplies the radius of Yaw rotation and the radius of Roll rotation, which have been calculated in steps S1201 to S1215, by the Yaw-weighted gain (Yaw Gain) and the Roll-weighted gain (Roll Gain). In this manner, the final rotation radius for Yaw correction and the final rotation radius for Roll correction are calculated, and the process is ended.

The output correction unit 806 computes the second term on the right side of Formula (5) using the rotation radius for Yaw correction obtained from the rotation radius selection unit 1111. Also, the output correction unit 814 computes the second term on the right side of Formula (6) using the rotation radius for Roll correction obtained from the rotation radius selection unit 1111. The outputs of the output correction unit 806 and the output correction unit 814 are sent to the adder 1112, and are added to an angular rotational shake correction amount. The output of the adder 1112 is input to the driving unit 112, and the shake correction unit 110 is driven by the driving unit 112. With this arrangement, image shake is corrected for both angular rotational shake and translational shake.

In the second embodiment, translational shake in each of the yaw direction and the roll direction is weighted to thereby calculate a translational shake correction amount. This prevents the image stabilization control performance from being degraded due to an excessive control amount of translational shake, and thus, image stabilization control for translational shake in both directions may be realized.

According to the second embodiment, even when translational shake is simultaneously affected by the rotation of the camera in the pitch direction or the yaw direction and the rotation of the camera in the roll direction, optimum translational shake correction may be performed. Therefore, a small-sized image stabilization control apparatus exhibiting high mobility may provide image stabilization in a stable manner even in the case of macro photography, that is, perform image shake correction in translational shake with high accuracy.

Third Embodiment

Next, a third embodiment of the present invention will be described.

Figure 13:
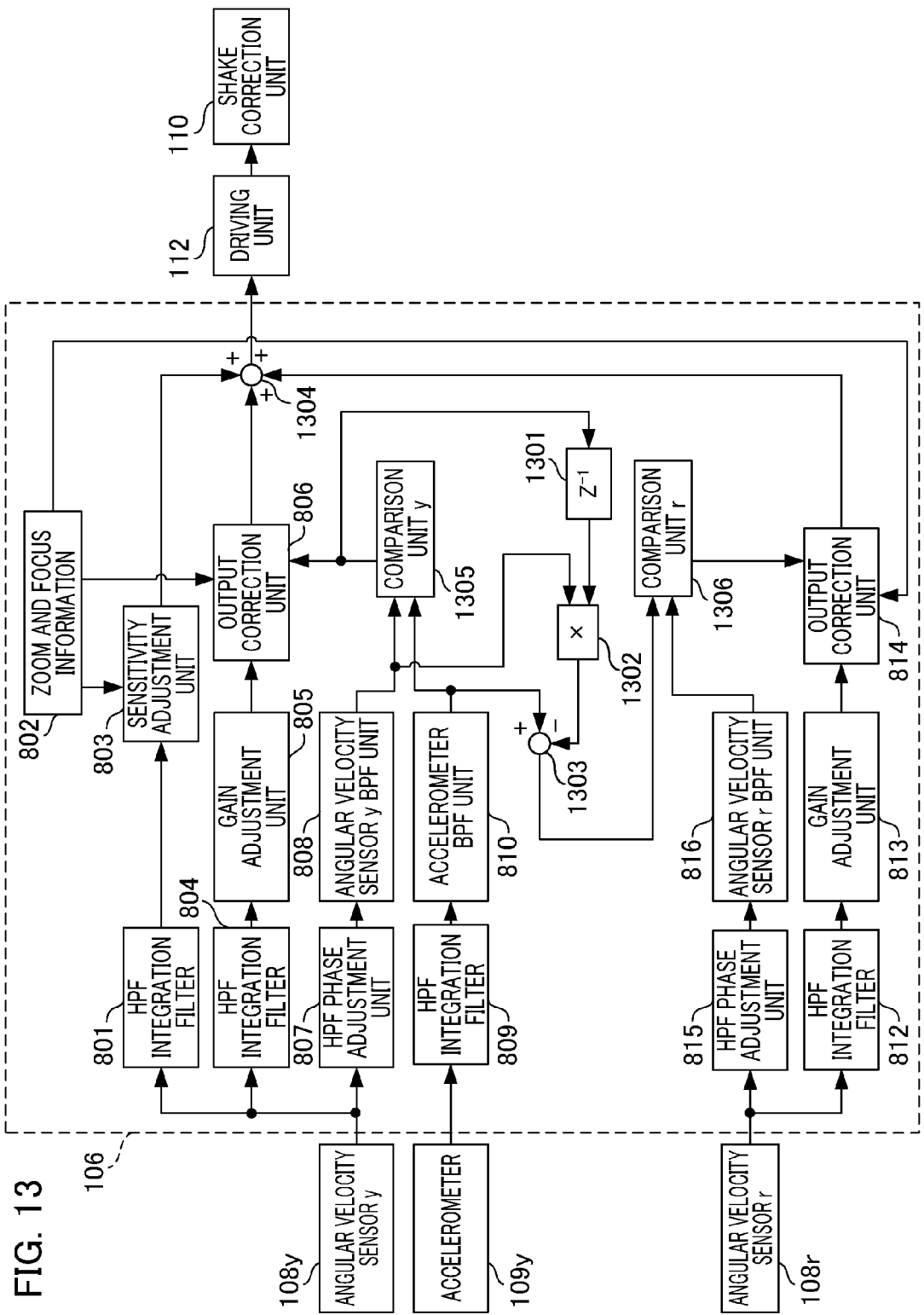
FIG. 13 is a block diagram illustrating an exemplary configuration of an image stabilization control apparatus according to a third embodiment of the present invention.

FIG. 13 is a block diagram illustrating an exemplary configuration of an image stabilization control apparatus according to the third embodiment. FIG. 13 only shows the configuration of the shake (directions shown by the arrows 103$y$ and 104$y$ in FIG. 1 and FIG. 2) generated in the horizontal direction of the camera 101. However, the same configuration is also provided for the shake (directions shown by the arrows 103$p$ and 104$p$ in FIG. 1 and FIG. 2) generated in the vertical direction of the camera. Since, except for the difference in direction, they basically have the same configuration, only the configuration in the horizontal direction of the camera will be described below.

In the first embodiment, as described with reference to FIG. 8, the rotation radii of the rotation of the camera in the yaw direction and the roll direction are calculated, and then, a translational shake correction amount is determined by using one of the rotation radii and the angular velocity. In contrast, in the third embodiment, translational shake caused by the rotation of the camera in either one (e.g., yaw direction) of the yaw direction or the roll direction is first calculated. The component affected by the calculated translational shake is subtracted from the accelerometer output, and then, the rotation radius and the translational shake correction amount in the other direction (e.g., roll direction) are calculated using the subtracted signal. Thus, the translational shake correction amount may be calculated for both translational shake caused by the rotation of the camera in the roll direction and translational shake caused by the rotation of the camera in the yaw direction.

The differences between the block diagrams shown in FIG. 8 and FIG. 13 are as follows.

The output selection unit 818 is eliminated, and the outputs of the output correction units 806 and 814 are input to an adder 1304.

The comparison unit y 811 is replaced by a comparison unit y 1305, and the comparison unit r 817 is replaced by a comparison unit r 1306.

A delay unit 1301 is provided for acquiring the output prior to one sampling period of the comparison unit y 1305, and a multiplier 1302 and a subtracter 1303 are also provided.

The outputs of the angular velocity sensor y BPF unit 808 and the accelerometer BPF unit 810 are input to a comparison unit y 1305, and the comparison unit y 1305 calculates the rotation radius to send it to the output correction unit 806. The output correction unit 806 computes an imaging magnification using the zoom and focus information 802, corrects the output of the gain adjustment unit 805, and calculate a translational shake correction target value in the yaw direction to output it to the adder 1304.

The output of the angular velocity sensor y BPF unit 808 is also sent to the multiplier 1302, and the multiplier 1302 multiplies the output by the output of the delay unit 1301. The multiplication results are sent the subtracter 1303 as a negative input. The output of the accelerometer BPF unit 810 is sent to the subtracter 1303 as a positive input, and the subtraction results are sent to the comparison unit r 1306. The comparison unit r 1306 compares the subtraction result obtained by the subtracter 1303 with the output of the angular velocity sensor r BPF unit 816. The rotation radius calculated by the comparison unit r 1306 is sent to the output correction unit 814.

In the third embodiment, a translational shake correction target value in the yaw direction is firstly calculated. Then, a signal in which the influence of shake in the yaw direction is removed from the output of the accelerometer BPF unit 810 is generated to thereby calculate a translational shake correction target value in the roll direction. A translational shake correction target value in the yaw direction is combined with that in the roll direction to thereby calculate a translational shake correction amount.

Hereinafter, a method for calculating a translational shake correction target value in the roll direction will be described.

The output of the comparison unit y 1305 indicates the rotation radius of angular rotational shake in the yaw direction (yaw rotation radius). The delay unit 1301 outputs the yaw rotation radius prior to one sampling period. The multiplier 1302 multiplies the yaw rotation radius prior to one sampling period by the output of the angular velocity sensor y BPF unit 808 to thereby calculate the translational shake velocity in the yaw direction in a set frequency band. The subtracter 1303 subtracts the output of the multiplier 1302 from the output of the accelerometer BPF unit 810, and outputs the subtraction result to the comparison unit r 1306. In the subtracter 1303, a translational shake velocity having the influence of the translational shake velocity in the yaw direction removed is calculated.

The output of the subtracter 1303 and the output of the angular velocity sensor r BPF unit 816 (roll angular velocity BPF signal) are input to the comparison unit r 1306, and thus, the rotation radius of angular rotational shake in the roll direction (roll rotation radius) is calculated. The output correction unit 814 computes an imaging magnification using the zoom and focus information 802, and corrects the output of the gain adjustment unit 813 based on the determined imaging magnification and the calculated roll rotation radius. In this manner, a correction target value of translational shake in the roll direction is computed.

The outputs of the output correction unit 806 and the output correction unit 814 are sent to the three-input adder 1304. The three-input adder 1304 adds an angular rotational shake correction amount to each of the outputs and the addition results are sent to the driving unit 112.

Figure 14:
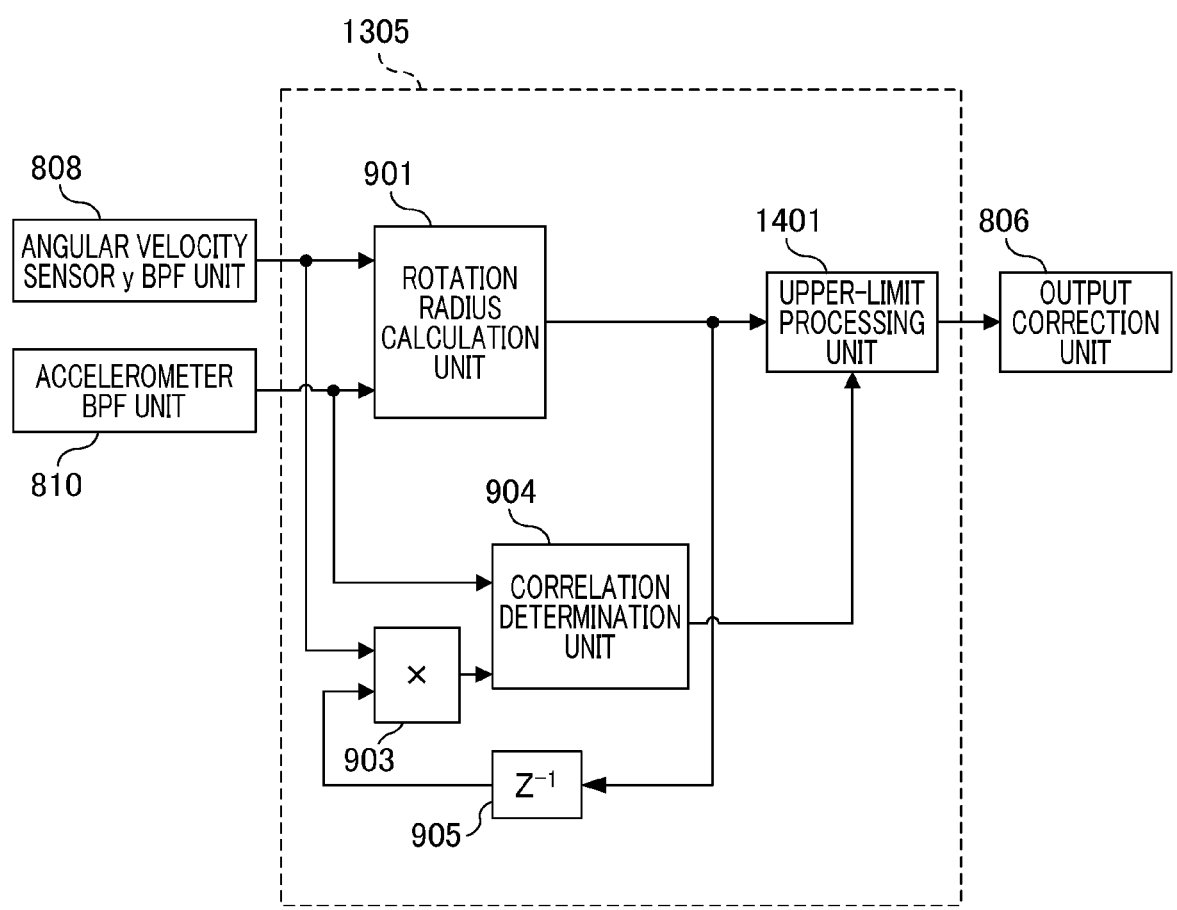
FIG. 14 is a block diagram illustrating the comparison unit shown in FIG. 13.

Next, processing performed by the comparison unit y 1305 and the comparison unit r 1306 will be described. Since the comparison unit y 1305 and the comparison unit r 1306 perform computation in similar fashion, in the following, a description will be given of the comparison unit y 1305. Computation blocks in the comparison unit y 1305 are shown in FIG. 14. The differences from the configuration shown in FIG. 8 are as follows.

The output of the rotation radius calculation unit 901 is input to the delay unit 905, and thus, the rotation radius prior to one sampling period is acquired.

The output of the rotation radius calculation unit 901 and the output of the correlation determination unit 904 are input to an upper-limit processing unit 1401, and the upper-limit processing unit 1401 outputs a signal clamped to an upper-limit value. The upper-limit value is variably set depending on the magnitude of the matching degree determination value output by the correlation determination unit 904.

The reason why the upper-limit value of the upper-limit processing unit 1401 is set depending on the magnitude of the matching degree determination value determined by the correlation determination unit 904 will be described below. When the matching degree determination value is small (a high degree of correlation), the upper-limit processing unit 1401 sets a large upper-limit value. When the matching degree determination value is large (a low degree of correlation), the upper-limit processing unit 1401 sets a small upper-limit value. This is for the prevention of the rotation radius from being larger when the degree of correlation is low. With this arrangement, the erroneous calculation of the translational shake correction amount due to the erroneous estimate of the rotation radius is prevented with respect to the influence of the rotation of the camera when the degree of correlation is small, and thus, the deterioration of the image stabilization control performance with respect to the translational shake may be prevented.

In the present embodiment, a method for calculating a yaw rotation radius and a roll rotation radius in the specific frequency has been described. The present invention is not limited thereto, but a method for calculating a rotation radius in each of a plurality of frequencies for the rotation in the yaw direction and the roll direction may be employed. In this case, the camera CPU 106 calculates the rotation radius from one angular velocity for each frequency, and removes the translational shake velocity, in which the angular velocity at the frequency is multiplied by the rotation radius, from the translational shake velocity at the frequency. The other rotation radius at the frequency is calculated from the translational shake velocity after removal and the other angular velocity at the frequency.

As described above, according to the third embodiment, even when translational shake is simultaneously affected by the rotation of the camera in the pitch direction or the yaw direction and the rotation of the camera in the roll direction, optimum translational shake correction may be performed. Therefore, a small-sized image stabilization control apparatus exhibiting high mobility may provide image stabilization in a stable manner even in the case of macro photography, that is, perform image shake correction in translational shake with high accuracy.

Fourth Embodiment

Next, a fourth embodiment of the present invention will be described.

Figure 15:
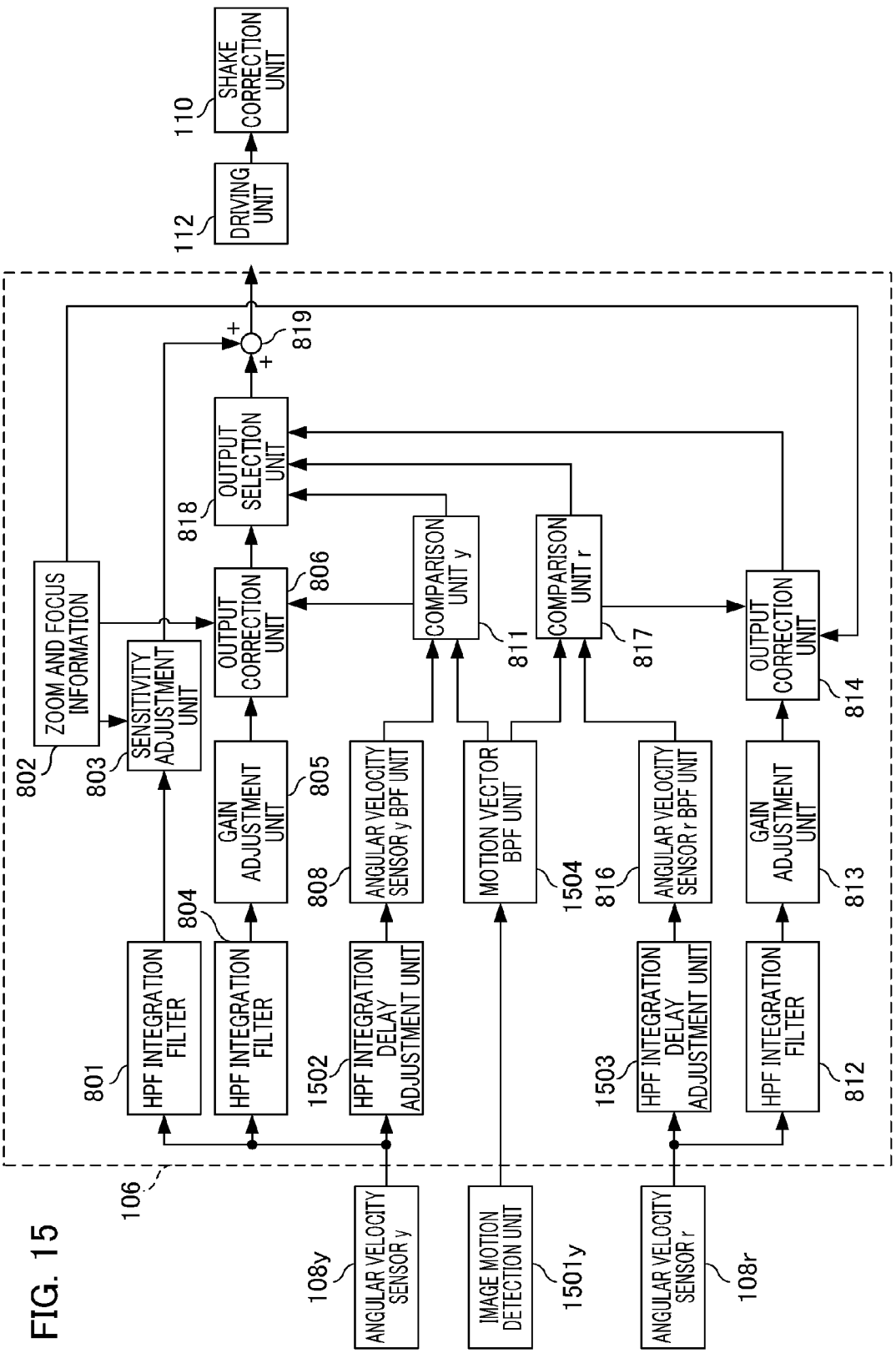
FIG. 15 is a block diagram illustrating an exemplary configuration of an image stabilization control apparatus according to a fourth embodiment of the present invention.

FIG. 15 is a block diagram illustrating an exemplary configuration of an image stabilization control apparatus according to a fourth embodiment of the present invention. FIG. 15 only shows the configuration regarding to the shake (directions shown by the arrows 103y and 104y in FIG. 1 and FIG. 2) generated in the horizontal direction of the camera 101. However, the same configuration is also provided for the shake (directions shown by the arrows 103p and 104p in FIG. 1 and FIG. 2) generated in the vertical direction of the camera. Since, except for the difference in direction, they basically have the same configuration, only the configuration in the horizontal direction of the camera will be described below.

A feature of the present embodiment is that a third shake detection unit detects a shake from the output signal of an imaging unit (see the imaging element 107 shown in FIG. 1 and FIG. 2). In other words, the camera CPU 106 detects the translational shake occurring around the principal point of the imaging optical system using the image output of the imaging element 107.

The differences between the configurations shown in FIG. 15 and FIG. 8 are as follows.

Instead of the accelerometer 109y, the HPF integration filter 809, and the accelerometer BPF unit 810, an image motion detection unit 1501y and a motion vector BPF unit 1504 are provided.

The HPF phase adjustment unit 807 is replaced by an HPF integration delay adjustment unit 1502.

The HPF phase adjustment unit 815 is replaced by an HPF integration delay adjustment unit 1503.

The method for detecting hand shake or composition deviation by comparing the image signals chronologically output from the imaging element 107 is well known and is widely employed as "electronic image stabilization" or "image combination" technology. However, in a method for calculating the length "L" of the rotation radius as described above, the angular velocity output can be corrected by utilizing image information at a capture preparation state (moving picture taking state) before capturing a still image. Accordingly, the image output, which has been conventionally utilized only in the case of capture moving images, can be used for translational shake correction in the case of capturing a still image.

Figure 16:
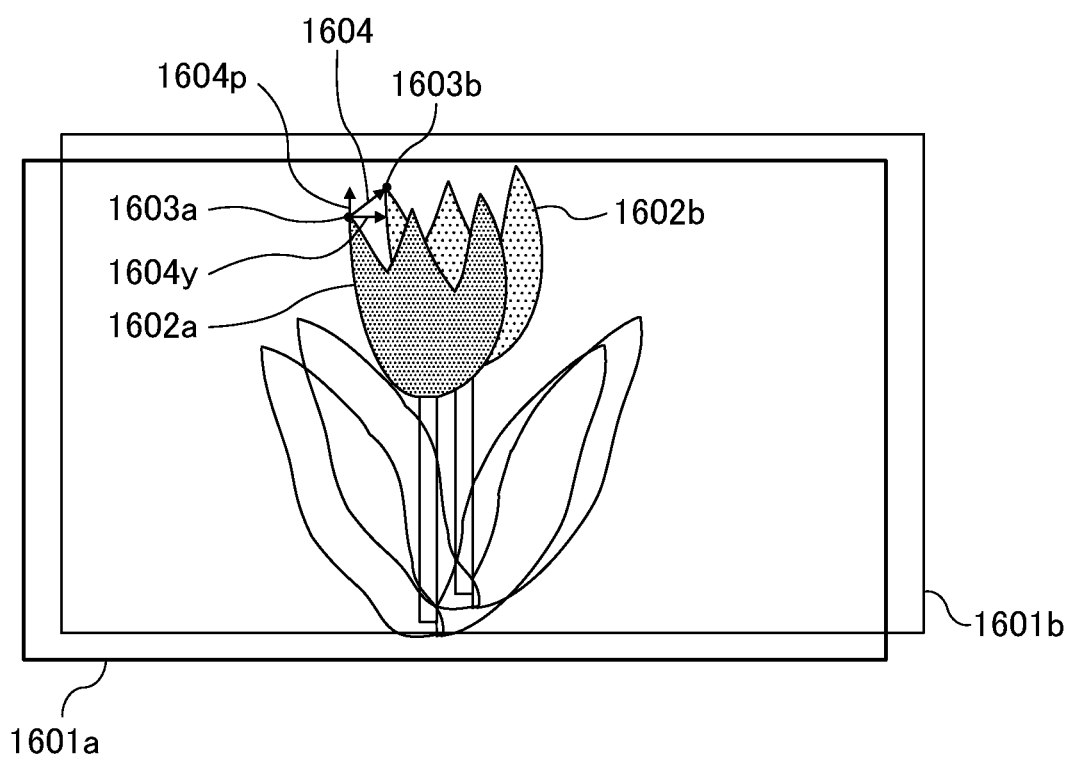
FIG. 16 is an illustrative diagram of motion vectors related to the image motion detection unit shown in FIG. 15.

FIG. 16 is an illustrative diagram of motion vectors. An image 1601a shows an exemplary image in which a main object (flower) is taken at a specific time. With respect to the image 1601a, an image 1601b, which is illustrated with thin lines, includes an image of the flower after a predetermined time period has elapsed (e.g., after $1/30$ seconds has elapsed).

The two images have different compositions caused by angular rotational shake and translational shake. The main object images are positionally displaced from each other in the up-and-down and right-and-left direction shown in FIG. 16.

In the image 1601a, the profiling 1603a of a flower 1602a, which is the main object of the image 1601a, is a high contrast area. When this is defined as a characteristic point, a characteristic point 1603b, which corresponds to the characteristic point 1603a, can be calculated based on positional information about a characteristic point 1603a and image information about a profiling of a flower 1602b of the image 1601b. When a motion vector 1604, which connects the two characteristic points, is separated into two components in the horizontal direction and the vertical direction, two components are shown by the arrow 1604y (horizontal direction component) and the arrow 1604p (vertical direction component). Displacement of shake on the image can be acquired by connecting the motion vector, which has been separated into components in two directions, for each image.

Taking a motion vector in the horizontal direction (see the arrow 1604y) as an example, processing for accumulating the motion vectors between images for each timing is performed. The image motion detection unit 1501y shown in FIG. 15 detects image motion. The output of the image motion detection unit 1501y is input to the motion vector BPF unit 1504. The motion vector BPF unit 1504 passes only a predetermined frequency band component (e.g., 2 Hz). With this arrangement, the present embodiment can remove the noise superposed on the motion vector and the low-frequency deviation that may occur due to the movement of the object, and thus, can detect only the hand shake component with high accuracy. The output of the motion vector BPF unit 1504 is sent to each of the comparison unit y 811 and the comparison unit r 817.

The output of the angular velocity sensor 108y in the yaw direction is sent to the HPF integration delay adjustment unit 1502 to convert the angular velocity into an angle by means of integration. Thus, the same dimension as that of the motion vector can be set. Then, the angular velocity sensor y BPF unit 808 removes a low-frequency drift component that may be superposed on the angle waveform.

The amount of image deviation on an image, which is acquired by accumulating motion vectors obtained from image information, is output such that the phase thereof is offset from an angle which is the integral value of the output of the angular velocity sensor 108y. The deviation of the phase is caused by the delay due to the time for reading the images with the imaging element 107. Thus, for the correction of the deviation of the phase, the HPF integration delay adjustment unit 1502 is provided. The output of the angular velocity sensor 108y is passed through the HPF integration delay adjustment unit 1502. Then, the angular velocity is integrated, and the delay equivalent to the delay in the imaging element 107 is added. Thus, the phase of the output of the angular velocity sensor y BPF unit 808 can be made the same as that of the output of the motion vector BPF unit 1504.

The outputs of the angular velocity sensor y BPF unit 808 and the motion vector BPF unit 1504 are input to the comparison unit y 811. The comparison unit y 811 calculates a correction value (first correction coefficient) for correcting the output of the gain adjustment unit 805. The output correction unit 806 computes an imaging magnification using the zoom and focus information 802, and corrects the output of the gain adjustment unit 805 based on the determined imaging magnification and the correction coefficient. In this manner, a correction target value of translational shake in the yaw direction is computed.

Likewise, a correction target value of translational shake in the roll direction is computed in a similar manner as described above. The output of the angular velocity sensor 108r is passed through the HPF integration delay adjustment unit 1503. Then, the angular velocity is integrated to be converted into an angle, and the delay equivalent to the delay in the imaging element 107 is added. Thus, the phase of the output of the angular velocity sensor r BPF unit 816 can be made the same as that of the output of the motion vector BPF unit 1504. The outputs of the angular velocity sensor r BPF unit 816 and the motion vector BPF unit 1504 are input to the comparison unit r 817. The comparison unit r 817 calculates a correction value (second correction coefficient) for correcting the output of the gain adjustment unit 813. The output correction unit 814 computes an imaging magnification using the zoom and focus information 802, and corrects the output of the gain adjustment unit 813 based on the determined imaging magnification and the correction coefficient. In this manner, a correction target value of translational shake in the roll direction is computed.

The outputs of the output correction unit 806 and the output correction unit 814 are input to the output selection unit 818 to thereby determine a translational shake correction target amount. The adder 819 adds a translational shake correction target value to an angular rotational shake correction target value obtained from the sensitivity adjustment unit 803, and the addition results are output to the driving unit 112. The shake correction unit 110 is driven by the driving unit 112, and thus, image shake is corrected for both angular rotational shake and translational shake.

In the present embodiment, only angular rotational shake correction is performed without translational shake correction until an image shooting is started. Even if the output signal from the imaging element 107 is delayed as described above, the output signal and the angular velocity signal can be compared with each other by also delaying the angular velocity signal. This is because a rotational radius is necessary only during image capture and it is not necessary to calculate a rotational radius in real time.

In the present embodiment, the image shake occurring in the imaging element 107 is detected by an image motion detection unit 1501. Then, angular rotational shake correction and translational shake correction are performed using the image motion detection unit 1501, the pitch angular velocity sensor or yaw angular velocity sensor, and the roll angular velocity sensor. Thus, since a dedicated accelerometer becomes unnecessary, a camera can be reduced in size and weight. Furthermore, the present embodiment performs electronic image stabilization in a stable manner even in the case of a capture preparation state to thereby perform angular rotational shake correction and translational shake detection in a parallel manner.

The summary of the embodiments is described as follows.

With respect to the translational shake in the horizontal direction of the camera, the shake correction in the horizontal direction is performed using the output of the angular velocity detection unit in the yaw direction, the output of the angular velocity detection unit in the roll direction, and the output of the acceleration detection unit or the image motion detection unit in the horizontal direction.

With respect to the translational shake in the vertical direction of the camera, the shake correction in the vertical direction is performed using the output of the angular velocity detection unit in the pitch direction, the output of the angular velocity detection unit in the roll direction, and the output of the acceleration detection unit or the image motion detection unit in the vertical direction.

The image stabilization control apparatus of the present invention can be implemented in a digital single-lens reflex camera or a digital compact camera. The present invention is not limited to thereto. The image stabilization control apparatus can also be implemented in various optical apparatuses such as a digital video camera, a monitoring camera, a Web camera, or a mobile phone.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-234208 filed Oct. 19, 2010 which is hereby incorporated by reference herein in its entirety.

What is claimed is:

1. An image stabilization control apparatus that corrects image shake in an imaging apparatus, comprising;
   a shake correction unit configured to be movable in a direction other than an imaging optical axis direction of the imaging apparatus;
   a first shake detection unit configured to detect angular rotational shake in a first direction perpendicular to the optical axis;
   a second shake detection unit configured to detect angular rotational shake in a second direction around the optical axis, the second direction not being the same direction as the first direction;
   a third shake detection unit configured to detect translational shake of the imaging apparatus;
   a calculation unit configured to calculate a first correction amount for use in the correction of translational shake in the first direction based on the outputs of the first and third shake detection units, and calculates a second correction amount for use in the correction of translational shake in the second direction based on the outputs of the second and third shake detection units; and
   a driving unit configured to drive the shake correction unit in accordance with at least one of the first and second correction amounts.

2. The image stabilization control apparatus according to claim 1, wherein the calculation unit arranged to calculate the first correction amount based on a first correction coefficient computed using the outputs of the first and third shake detection units and the output of the first shake detection unit, and calculates the second correction amount based on a second correction coefficient computed using the outputs of the second and third shake detection units and the output of the second shake detection unit.

3. The image stabilization control apparatus according to claim 2, wherein the calculation unit calculates a correction amount for use in the correction of angular rotational shake in the first direction from the output of the first shake detection unit, and combines the correction amount and the first or second correction amounts to output the resulting amount to the driving unit.

4. The image stabilization control apparatus according to claim 2, wherein the calculation unit further comprises:
   a first comparison unit configured to compute the first correction coefficient by use of a comparison arithmetic between a first signal obtained by the first shake detection unit and a third signal obtained by the third shake detection unit; and
   a second comparison unit configured to compute the second correction coefficient by use of a comparison arithmetic between a second signal obtained by the second shake detection unit and a third signal obtained by the third shake detection unit.

5. The image stabilization control apparatus according to claim 4, wherein the first comparison unit determines a first determination value by performing correlation determination between the first signal and the third signal,
   wherein the second comparison unit determines a second determination value by performing correlation determination between the second signal and the third signal, and
   wherein the calculation unit outputs the first correction amount to the driving unit when the first determination value has the degree of correlation greater than second determination value, and outputs the second correction amount to the driving unit when the second determination value has the degree of correlation greater than first determination value.

6. The image stabilization control apparatus according to claim 4, wherein the first comparison unit determines a first determination value by performing correlation determination between the first signal and the third signal,
   wherein the second comparison unit determines a second determination value by performing correlation determination between the second signal and the third signal, and
   wherein the calculation unit computes the first correction amount by use of a weighting arithmetic in which the first correction coefficient is weighted by the first and second determination values, computes the second correction amount by use of a weighting arithmetic in which the second correction coefficient is weighted by the first and second determination values, and composes the first correction amount and the second correction amount to output the resulting amount to the driving unit.

7. The image stabilization control apparatus according to claim 2, wherein the calculation unit computes the first correction coefficient, and then generates a signal in which a component of translational shake associated with angular rotational shake in the first direction is removed from the signal obtained by the third shake detection unit to thereby compute the second correction coefficient using the signal obtained by the second shake detection unit and the signal having the component of the translational shake thereof removed.

8. The image stabilization control apparatus according to claim 1, wherein the first shake detection unit detects the angular velocity of the device in the pitch direction or yaw direction, and the second shake detection unit detects the angular velocity of the device in the roll direction.

9. An imaging apparatus comprising the image stabilization control apparatus according to claim 1.

10. A method for controlling an image stabilization control apparatus that comprises a shake correction unit configured to be movable in a direction different from an imaging optical axis direction, the method comprising;
   detecting angular rotational shake in a first direction perpendicular to the optical axis;
   detecting angular rotational shake in a second direction around the optical axis, the second direction is not the same as the first direction;
   detecting a translational shake of the device;
   calculating a first correction amount for use in the correction of translational shake in the first direction based on the outputs of the detected angular rotational shake in the first direction and the detected translational shake;

calculating a second correction amount for use in the correction of translational shake in the second direction based on the outputs of the detected angular rotational shake in the second direction and the detected translational shake; and driving the shake correction unit in accordance with at least one of the first and second correction amounts.

11. The method according to claim 10, wherein, in the calculating step, the first correction amount is calculated based on a first correction coefficient computed using the outputs of the detected angular rotational shake in the first direction and the detected translational shake and the output of the detected angular rotational shake in the first direction, and the second correction amount is calculated based on a second correction coefficient computed using the outputs of the detected angular rotational shake in the second direction and the detected translational shake and the output of the detected angular rotational shake in the second direction.

12. The method according to claim 11, wherein, in the calculating step, a correction amount for use in the correction of the angular rotational shake in the first direction is calculated from the output of the detected angular rotational shake in the first direction, and the correction amount and the first or second correction amounts are combined for use in the driving step.

13. The method according to claim 11, wherein the calculating step further comprises:

comparing and computing, in a first comparing step, the first correction coefficient by use of a comparison arithmetic between a first signal obtained by the detected angular rotational shake in the first direction and a third signal obtained by the detected translational shake; and comparing and computing, in a second comparing step, the second correction coefficient by use of a comparison arithmetic between a second signal obtained by the detected angular rotational shake in the first direction and a third signal obtained by the detected translational shake.

14. The method according to claim 13, wherein, in the first comparing step, a first determination value is determined by performing correlation determination between the first signal and the third signal, wherein, in the second comparing step, a second determination value is determined by performing correlation determination between the second signal and the third signal, and wherein, in the calculation step, the first correction amount is output for use in the driving step when the first determination value has the degree of correlation greater than second determination value, and the second correction amount is output for use in the driving step when the second determination value has the degree of correlation greater than the first determination value.

15. The method according to claim 13, wherein, in the first comparing step, a first determination value is determined by performing correlation determination between the first signal and the third signal, wherein, in the second comparing step, a second determination value is determined by performing correlation determination between the second signal and the third signal, and wherein, in the calculation step, the first correction amount is computed by use of a weighting arithmetic in which the first correction coefficient is weighted by the first and second determination values, the second correction amount is computed by use of a weighting arithmetic in which the second correction coefficient is weighted by the first and second determination values, and the first correction amount and the second correction amount are composed for use in the driving step.

16. The method according to claim 11, wherein, in the calculation step, a signal in which a component of translational shake associated with angular rotational shake in the first direction is removed from the signal obtained by the detected translational shake is generated after computation of the first correction coefficient, and the second correction coefficient is computed by using the signal obtained by detected the angular rotational shake in the second direction and the signal having the component of the translational shake thereof removed.

17. The method according to claim 10, wherein the angular velocity of the device in the pitch direction or yaw direction is detected as the angular rotational shake in the first direction, and the angular velocity of the device in the roll direction is detected as the angular rotational shake in the second direction.

* * * * *